United States Patent
Asai et al.

(10) Patent No.: US 9,900,450 B2
(45) Date of Patent: Feb. 20, 2018

(54) IMAGE FORMING APPARATUS, METHOD OF CONTROLLING THE SAME, AND RECORDING MEDIUM

(71) Applicants: Shinichi Asai, Gamagoori (JP); Jiro Goto, Toyokawa (JP); Takashi Oikawa, Toyohashi (JP)

(72) Inventors: Shinichi Asai, Gamagoori (JP); Jiro Goto, Toyokawa (JP); Takashi Oikawa, Toyohashi (JP)

(73) Assignee: KONICA MINOLTA BUSINESS TECHNOLOGIES, INC., Chiyoda-ku, Tokyo (JP)

( * ) Notice: Subject to any disclaimer, the term of this patent is extended or adjusted under 35 U.S.C. 154(b) by 768 days.

(21) Appl. No.: 13/759,857

(22) Filed: Feb. 5, 2013

(65) Prior Publication Data

US 2013/0207915 A1    Aug. 15, 2013

(30) Foreign Application Priority Data

Feb. 13, 2012    (JP) .................................. 2012-028049

(51) Int. Cl.
*G06F 3/048*    (2013.01)
*H04N 1/00*    (2006.01)
(Continued)

(52) U.S. Cl.
CPC ..... *H04N 1/00392* (2013.01); *G06F 3/04847* (2013.01); *G06F 3/04883* (2013.01);
(Continued)

(58) Field of Classification Search
CPC ............. H04N 1/00; G09G 5/00; G06F 3/034
See application file for complete search history.

(56) References Cited

U.S. PATENT DOCUMENTS 6,310,613 B1 *  10/2001  Tanaka ................ G06F 3/04847
                                                    345/156
2005/0253643 A1    11/2005  Inokawa et al.
(Continued)

FOREIGN PATENT DOCUMENTS

CN    1239786 A    12/1999
JP    63-174125 A    7/1988
(Continued)

OTHER PUBLICATIONS

Office Action (Notification of the First Office Action) dated Jan. 27, 2015, by the State Intellectual Property Office of the People's Republic of China in corresponding Chinese Patent Application No. 201310050042.1, and an English translation of the Office Action. (19 pages).

(Continued)

*Primary Examiner* — Tony N Ngo
(74) *Attorney, Agent, or Firm* — Buchanan Ingersoll & Rooney PC

(57) ABSTRACT

An image forming apparatus includes a processing portion, a storage portion, and a touch pad. The processing portion is adapted to accept input of a value for a prescribed processing condition for an image forming job. The storage portion is adapted to store the value accepted by the processing portion. The touch pad is adapted to accept a touch operation. The processing portion updates the value stored in the storage portion based on a manner of change in touch position resulting from a second touch operation on the touch pad while a first touch operation in a prescribed region of the touch pad continues.

28 Claims, 32 Drawing Sheets

(51) Int. Cl.
*G06F 3/0488* (2013.01)
*G06F 3/0484* (2013.01)

(52) U.S. Cl.
CPC ..... *H04N 1/00411* (2013.01); *H04N 1/00482* (2013.01); *H04N 2201/0094* (2013.01)

(56) References Cited

U.S. PATENT DOCUMENTS

2007/0103452 A1\* 5/2007 Wakai et al. .................. 345/173
2013/0127911 A1\* 5/2013 Brown ................ G06F 3/04886
                                                                   345/649

FOREIGN PATENT DOCUMENTS

| JP | 07-121291 A | 12/1995 |
| JP | 08-249125 A | 9/1996 |
| JP | 11-338600 A | 12/1999 |
| JP | 2004-171512 A | 6/2004 |
| JP | 2006-042170 A | 2/2006 |
| JP | 2009-080521 A | 4/2009 |

OTHER PUBLICATIONS

Japanese Office Action (Notice of Grounds of Rejection) dated Jan. 28, 2014, issued in corresponding Japanese Patent Application No. 2012-028049 and an English Translation thereof. (6 pgs).

\* cited by examiner

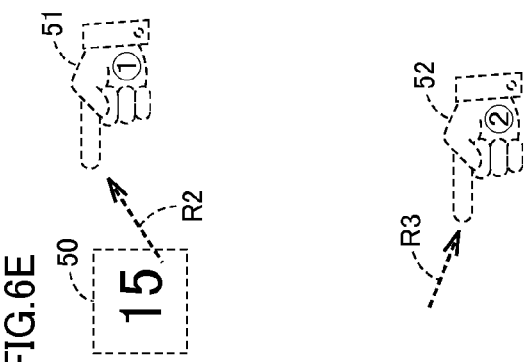
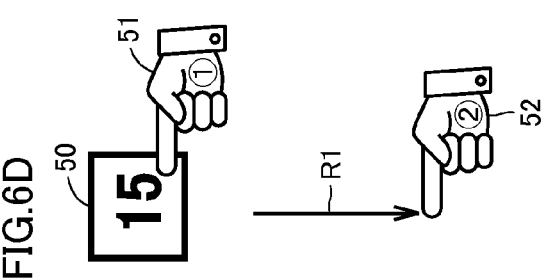
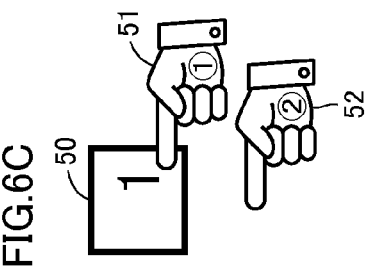
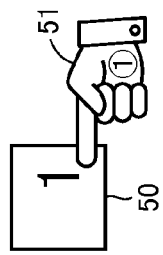
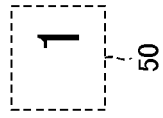

FIG.12

| DISTANCE OF MOVEMENT | ADDITION VALUE |
|---|---|
| 1−9 | 0 |
| 10−14 | 1 |
| 15−17 | 2 |
| 18−19 | 3 |
| : | : |

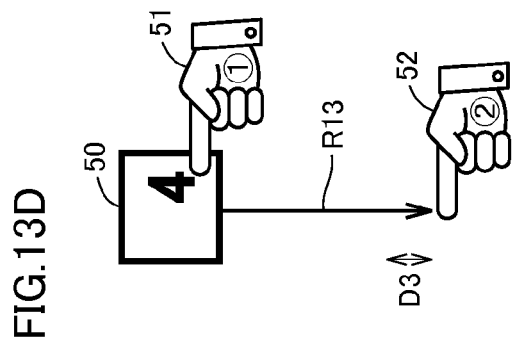
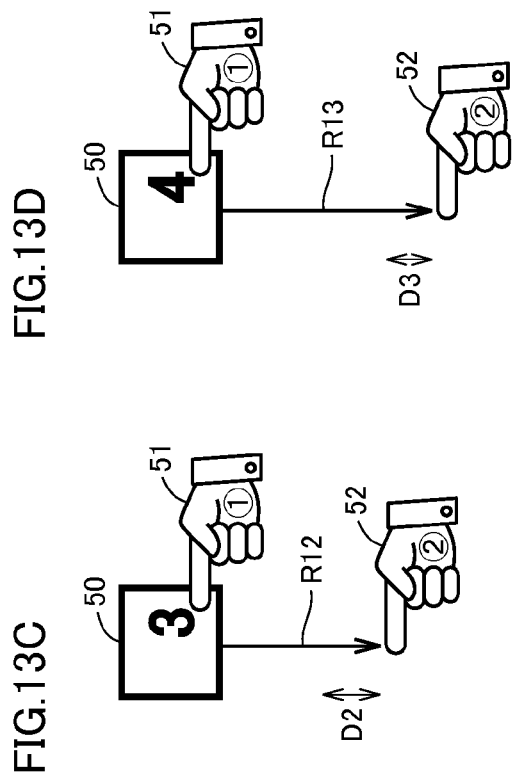
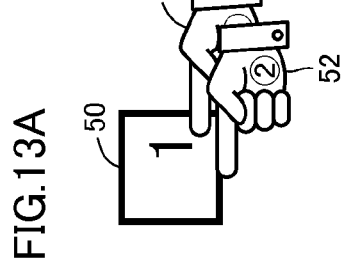

FIG.18

| NUMERIC VALUE TO BE INPUT | MAINTAIN/INITIALIZE |
|---|---|
| THE NUMBER OF COPIES | INITIALIZATION |
| PRINT LAYOUT | MAINTAIN |
| : | : |

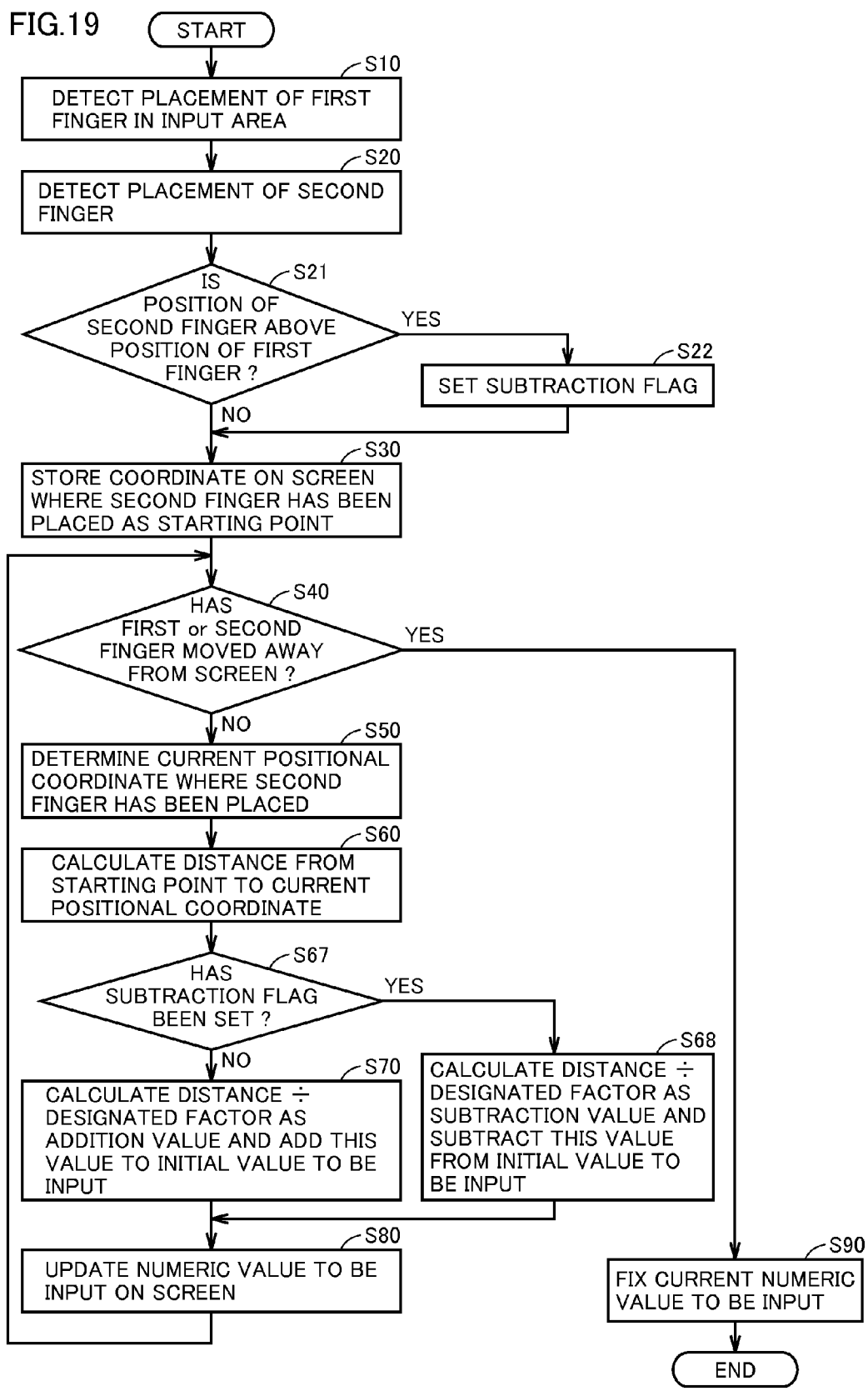

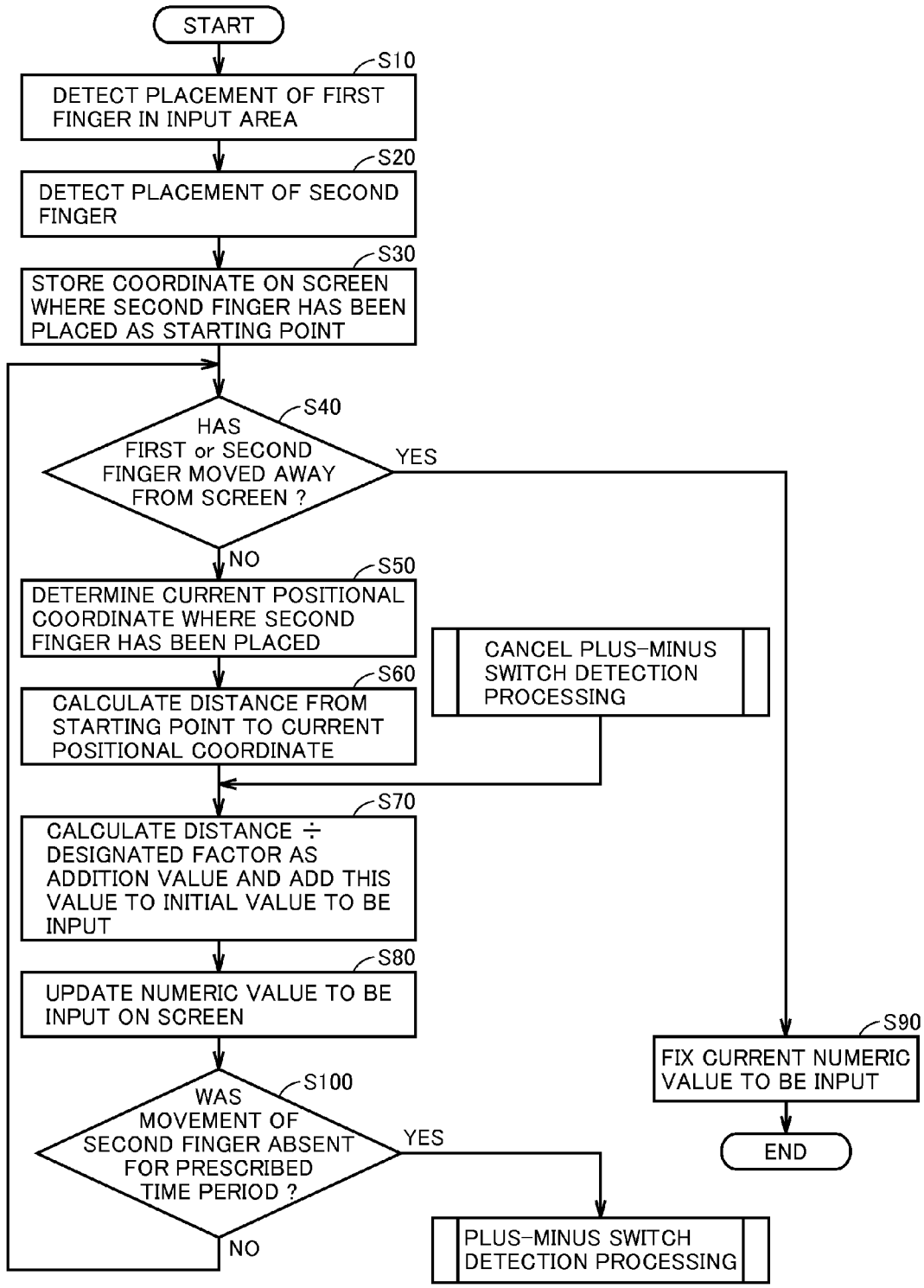

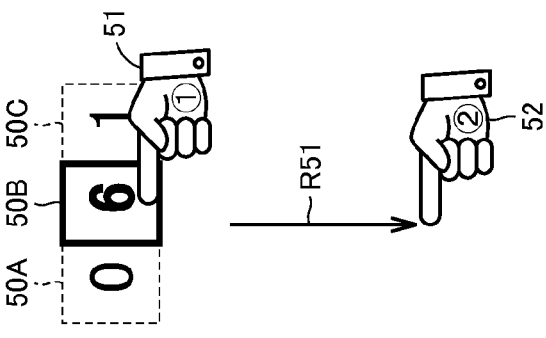
FIG.26A  FIG.26B  FIG.26C  FIG.26D
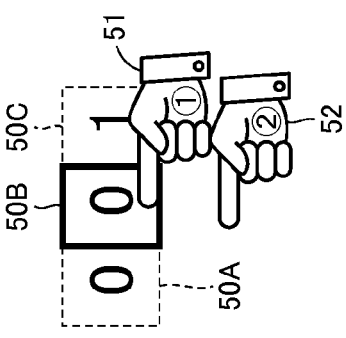
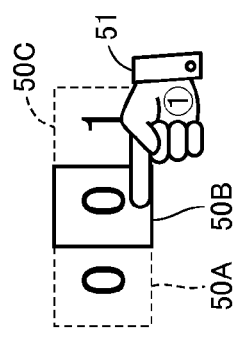
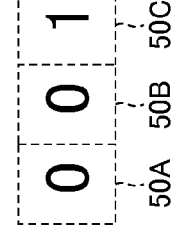

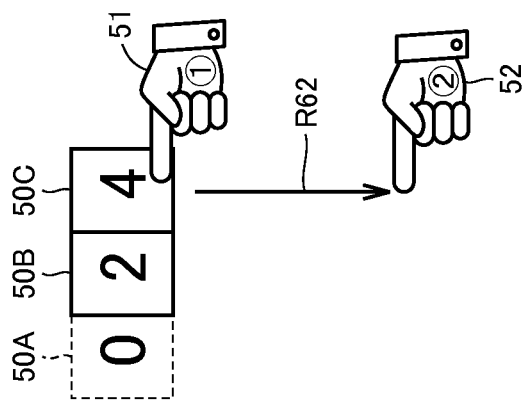
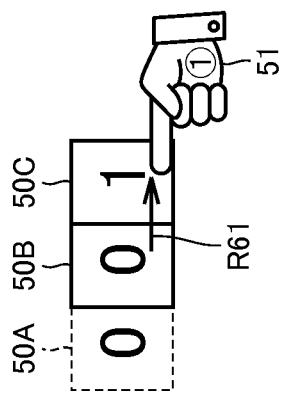
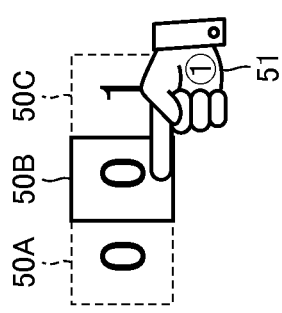

IMAGE FORMING APPARATUS, METHOD OF CONTROLLING THE SAME, AND RECORDING MEDIUM

This application is based on Japanese Patent Application No. 2012-028049 filed with the Japan Patent Office on Feb. 13, 2012, the entire content of which is hereby incorporated by reference.

BACKGROUND OF THE INVENTION

Field of the Invention

The present invention relates to an image forming apparatus and particularly to an image forming apparatus for accepting input of a numeric value and a control program therefor.

Description of the Related Art

Various techniques have conventionally been disclosed in connection with screen display in inputting information to an image forming apparatus.

For example, Japanese Laid-Open Patent Publication No. 63-174125 discloses a technique for representing each file stored in an apparatus with a card-shaped icon, displaying icons as being superimposed on one another, and scrolling the superimposed icons for display as if weight of the card corresponding to each icon were felt.

In addition, Japanese Laid-Open Patent Publication No. 2004-171512 discloses a technique for providing feedback of kinesthetic sense to a user by driving a piezoelectric actuator in an operation for pressing a button icon displayed on a touch panel in an input apparatus.

Moreover, Japanese Laid-Open Patent Publication No. 2006-42170 discloses a technique in connection with volume control in a reproduction apparatus, for displaying a plurality of objects radially aligned on a touch panel and increasing or decreasing the volume in accordance with a direction of operation along an outer periphery thereof.

According to the conventional techniques, however, in the case of inputting information such as a numeric value to a display device, some kind of image such as an icon or an object has had to be displayed. Then, in order to ensure a display region for such an image, display of other information such as information desirably referred to in input of a numeric value may be interfered and user's convenience may be hampered.

SUMMARY OF THE INVENTION

The present invention was made in view of such circumstances, and an object thereof is to improve user's convenience in inputting a numeric value in an image forming apparatus.

According to one aspect, an image forming apparatus is provided. The image Banning apparatus includes a processing portion adapted to accept input of a value for a prescribed processing condition for an image forming job, a storage portion adapted to store the value accepted by the processing portion, and a touch pad adapted to accept a touch operation. The processing portion updates the value stored in the storage portion based on a manner of change in touch position resulting from a second touch operation on the touch pad while a first touch operation in a prescribed region of the touch pad continues.

Preferably, the processing portion is adapted to update the value stored in the storage portion based on a distance by which the touch position resulting from the second touch operation has been changed.

Preferably, when the distance has changed by a length equal to or longer than a length corresponding to a maximum value of an amount of change for the value stored in the storage portion, the processing portion is adapted not to update the value in spite of change in distance equal to or longer than the length.

Preferably, the processing portion is adapted to update the value in response to a shorter distance of movement as an updated value is greater.

Preferably, the processing portion is adapted to cause a display device to display the value stored in the storage portion, and in addition, is adapted to change a manner of display of the value between a case where the first touch operation is performed and a case where it is not performed.

Preferably, the processing portion is adapted to maintain the value stored in the storage portion when the first touch operation ends before the second touch operation ends.

Preferably, whether or not the value stored in the storage portion is to be updated to a predetermined value can be set in the image forming apparatus each time start of the first touch operation is detected.

Preferably, the processing portion is adapted to update by addition the value stored in the storage portion when the touch position where the second touch operation is started is on one side in a prescribed direction with respect to the touch position resulting from the first touch operation, and is adapted to update by subtraction the value stored in the storage portion when it is on the other side in the prescribed direction.

Preferably, the processing portion is adapted to switch a positive or negative sign of the value stored in the storage portion when the touch position does not move for a prescribed time period or longer in the second touch operation and then when the touch position resulting from the second touch operation has moved in a prescribed direction.

Preferably, the processing portion is adapted to switch a positive or negative sign of the value stored in the storage portion when a third touch operation is performed at a position different from positions resulting from the first touch operation and the second touch operation while the first touch operation and the second touch operation continue.

Preferably, the processing portion is adapted to accept input of the value for each digit.

Preferably, the touch pad includes an input region predetermined for each digit for the value, and the processing portion is adapted to accept input of the value for a digit corresponding to an input region included in an operation target of the first touch operation, in the input region.

Preferably, the processing portion is adapted to update the value stored in the storage portion on condition that the first touch operation has ended.

Preferably, the processing portion is adapted to perform first processing for updating the value stored in the storage portion and second processing for changing a zoom factor for display, based on a manner of change in touch position resulting from the second touch operation at a position different from the touch position resulting from the first touch operation while the first touch operation in the prescribed region of the touch pad continues, and which of the first processing and the second processing is to preferentially be performed is set.

According to another aspect, a method of controlling an image forming apparatus including a processing portion for accepting input of a value for a prescribed processing condition for an image forming job, a storage portion for storing the value accepted by the processing portion, and a touch pad for accepting a touch operation is provided. The method includes accepting, by the image forming apparatus, a first touch operation in a prescribed region of the touch pad, accepting, by the image forming apparatus, a second touch operation on the touch pad while the first touch operation continues, and updating, by the image forming apparatus, the value stored in the storage portion based on a manner of change in touch position resulting from the second operation.

Preferably, the updating the value includes updating the value stored in the storage portion based on a distance by which the touch position resulting from the second touch operation has been changed.

Preferably, when the distance has changed by a length equal to or longer than a length corresponding to a maximum value of an amount of change for the value stored in the storage portion, the updating includes maintaining the value in spite of change in distance equal to or longer than the length.

Preferably, the updating includes updating the value in response to a shorter distance of movement as an updated value is greater.

Preferably, the updating includes causing a display device to display the value stored in the storage portion and changing a manner of display of the value between a case where the first touch operation is performed and a case where it is not performed.

Preferably, the updating includes maintaining the value stored in the storage portion when the first touch operation ends before the second touch operation ends.

Preferably, the method further includes setting whether or not the value stored in the storage portion is to be updated to a predetermined value each time start of the first touch operation is detected.

Preferably, the updating includes updating by addition the value stored in the storage portion when the touch position where the second touch operation is started is on one side in a prescribed direction with respect to the touch position resulting from the first touch operation, and updating by subtraction the value stored in the storage portion when the touch position where the second touch operation is started is on the other side in the prescribed direction with respect to the touch position resulting from the first touch operation.

Preferably, the updating includes switching a positive or negative sign of the value stored in the storage portion when the touch position does not move for a prescribed time period or longer in the second touch operation and then when the touch position resulting from the second touch operation has moved in a prescribed direction.

Preferably, the updating includes switching a positive or negative sign of the value stored in the storage portion when a third touch operation is performed at a position different from positions resulting from the first touch operation and the second touch operation while the first touch operation and the second touch operation continue.

Preferably, the updating includes accepting input of the value for each digit.

Preferably, the touch pad includes an input region predetermined for each digit for the value, and the accepting includes accepting input of the value for a digit corresponding to an input region included in an operation target of the first touch operation, in the input region.

Preferably, the updating includes updating the value stored in the storage portion on condition that the first touch operation has ended.

Preferably, the updating includes performing first processing for updating the value stored in the storage portion and second processing for changing a zoom factor for display, based on a manner of change in touch position resulting from the second touch operation at a position different from the touch position resulting from the first touch operation while the first touch operation in a prescribed region of the touch pad continues, and the method further includes setting which of the first processing and the second processing is to preferentially be performed.

According to yet another aspect, a non-transitory computer-readable recording medium recording a program executable by a computer of an image forming apparatus including a processing portion for accepting input of a value for a prescribed processing condition for an image forming job, a storage portion for storing the value accepted by the processing portion, and a touch pad for accepting a touch operation is provided. The program causes the computer to perform accepting a first touch operation in a prescribed region of the touch pad and accepting a second touch operation on the touch pad while the first touch operation continues, and updating, by the image forming apparatus, the value stored in the storage portion based on a manner of change in touch position resulting from the second operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6E are diagrams showing a touch operation on the display panel and display contents in accordance therewith in the numeric value input processing.

FIG. 12 is a diagram showing one example of a table of addition values.

FIGS. 13A to 13D are diagrams showing relation between an addition value and a distance of movement in the certain embodiment.

FIG. 18 is a diagram showing one example of setting contents in the MFP.

FIG. 19 is a flowchart of numeric value input processing in a certain embodiment.

FIG. 21 is a flowchart of numeric value input processing in a certain embodiment.

FIGS. 26A to 26D are diagrams for illustrating an operation on the display panel in the numeric value input processing in the certain embodiment.

FIGS. 28A to 28C are diagrams for illustrating an operation on the display panel in the numeric value input processing in the certain embodiment.

DESCRIPTION OF THE PREFERRED EMBODIMENTS

Figure 1:
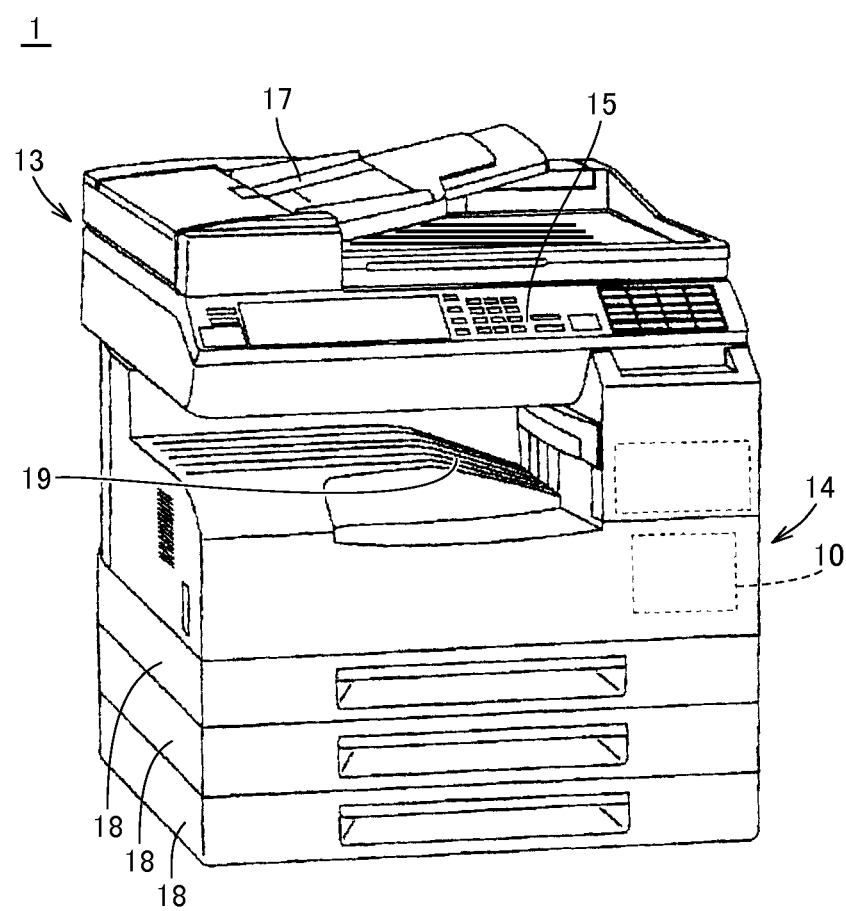
FIG. 1 is a diagram showing appearance of an MFP (Multi-Functional Peripheral) 1 representing a certain embodiment.

An embodiment of an image forming apparatus will be described hereinafter in detail with reference to the drawings. It is noted that an element having the same function in each figure has the same reference character allotted and description thereof will not be repeated.

[Embodiment 1]

<Appearance of Image Forming Apparatus>

FIG. 1 is a diagram showing appearance of an MFP 1 representing one embodiment. Appearance of MFP 1 will be described with reference to FIG. 1.

As shown in FIG. 1, MFP 1 includes an operation portion (an operation interface) 15 for inputting an operation instruction and characters and numbers to MFP 1. In addition, MFP 1 includes a scanner portion 13 and a printer portion 14. Scanner portion 13 obtains image data by photoelectrically scanning a document. Printer portion 14 prints an image on a sheet of paper based on the image data obtained by scanner portion 13 or image data received from external equipment connected through a network.

In addition, MFP 1 includes a feeder portion 17 for feeding a document to scanner portion 13 on an upper surface of its main body, a paper feed portion 18 for supplying paper to printer portion 14 in a lower portion of the main body, and a tray 19 to which paper having an image printed thereon by printer portion 14 is ejected in a central portion thereof.

<Hardware Configuration of Image Forming Apparatus>

Figure 2:
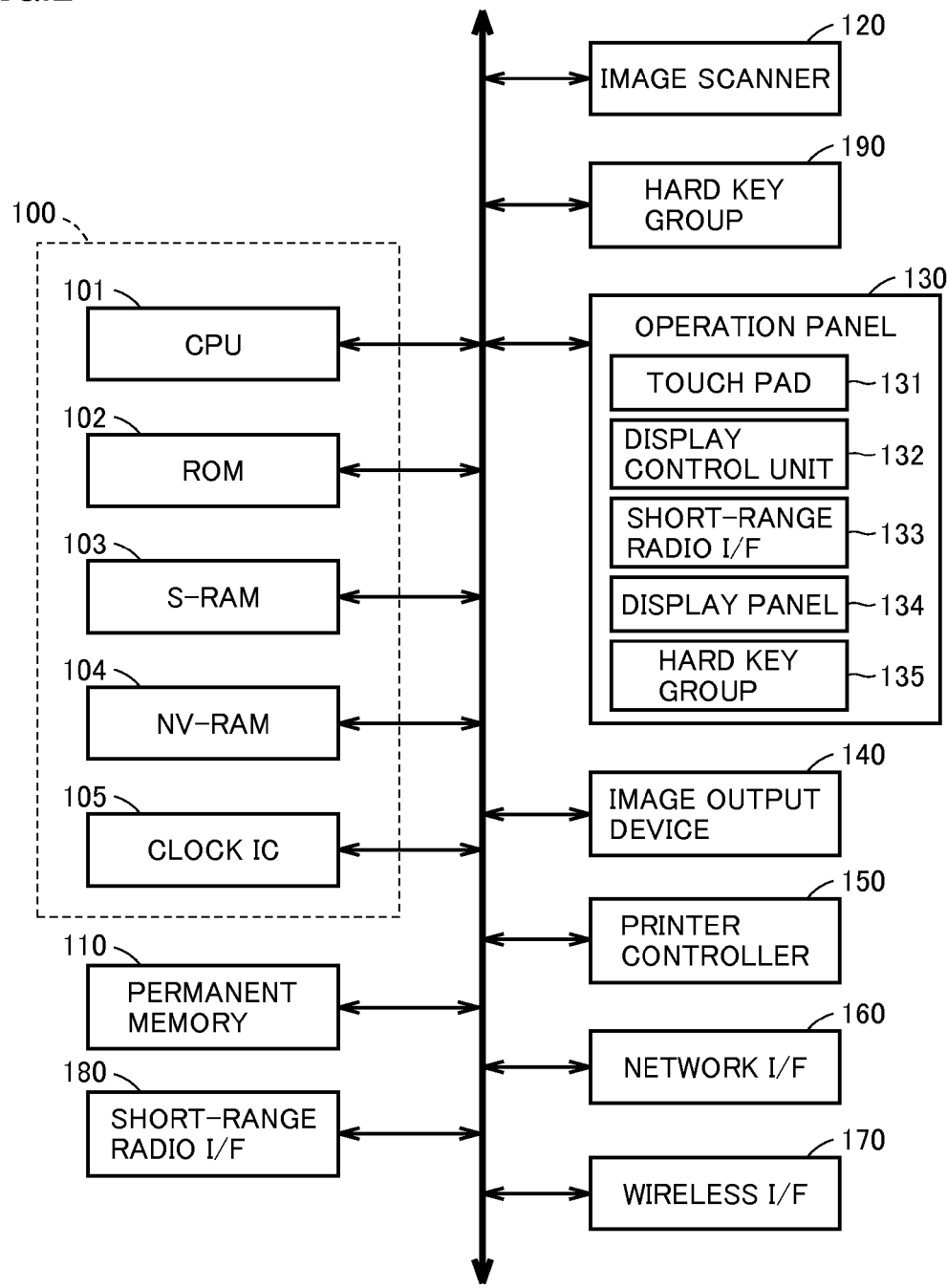
FIG. 2 is a block diagram of the MFP in FIG. 1.

FIG. 2 is a block diagram of MFP 1. A hardware configuration of MFP 1 will be described with reference to FIG. 2.

As shown in FIG. 2, MFP 1 includes a control unit 100 for overall control of an operation of MFP 1. Control unit 100 includes a CPU (Central Processing Unit) 101, a ROM (Read Only Memory) 102, an S-RAM (Static Random Access Memory) 103, an NV-RAM (Non Volatile Random Access Memory) 104, and a clock IC (Integrated Circuit) 105. NV-RAM 104 stores data of initial setting or the like of the MFP. MFP 1 further includes a permanent memory 110 implemented by a hard disk drive or the like for storing a program executed by CPU 101.

It is noted that a program executed by CPU 101 may be stored in advance in permanent memory 110 at the time of shipment of MFP 1 or the like or may be downloaded via a network and stored in permanent memory 110. Alternatively, a program may be stored in a storage medium attachable to and removable from MFP 1 so that CPU 101 reads the program from the storage medium and executes the program. Examples of storage media include media storing a program in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical) disc, an MD (Mini Disc), an IC (Integrated Circuit) card (except for memory cards), an optical card, a mask ROM, an EPROM, an EEPROM (Electronically Erasable Programmable Read-Only Memory), and the like.

Furthermore, MFP 1 includes an image scanner 120 and an image output device 140. Image scanner 120 is a mechanism for scanning a document image and generating image data, and it includes scanner portion 13 and feeder portion 17. Image output device 140 is a mechanism for printing image data on paper and it includes printer portion 14. A printer controller 150 controls print timing or the like of image output device 140.

As will be described later, operation portion 15 of MFP 1 includes a hardware key group (hereinafter abbreviated as a "hard key group") 190 provided in the main body of MFP 1 and an operation panel 130. Operation panel 130 is constructed to be attachable to and removable from the main body of MFP 1, and it includes a touch pad 131, a display control unit 132, a short-range radio I/F (interface) 133, a display panel 134, and a hardware key group 135. A construction of operation panel 130 will be described later with reference to FIG. 3 or the like.

MFP 1 includes a short-range radio I/F 180. In MFP 1, a main body side thereof and operation panel 130 communicate with each other through short-range radio I/F 180 and short-range radio I/F 133. It is noted that short-range radio I/F 180 may be made use of for communication with external equipment other than operation panel 130. In addition, MFP 1 includes a network I/F 160 and a wireless I/F 170 for communicating with an external device.

<Configuration of Operation Portion>

Figure 3:
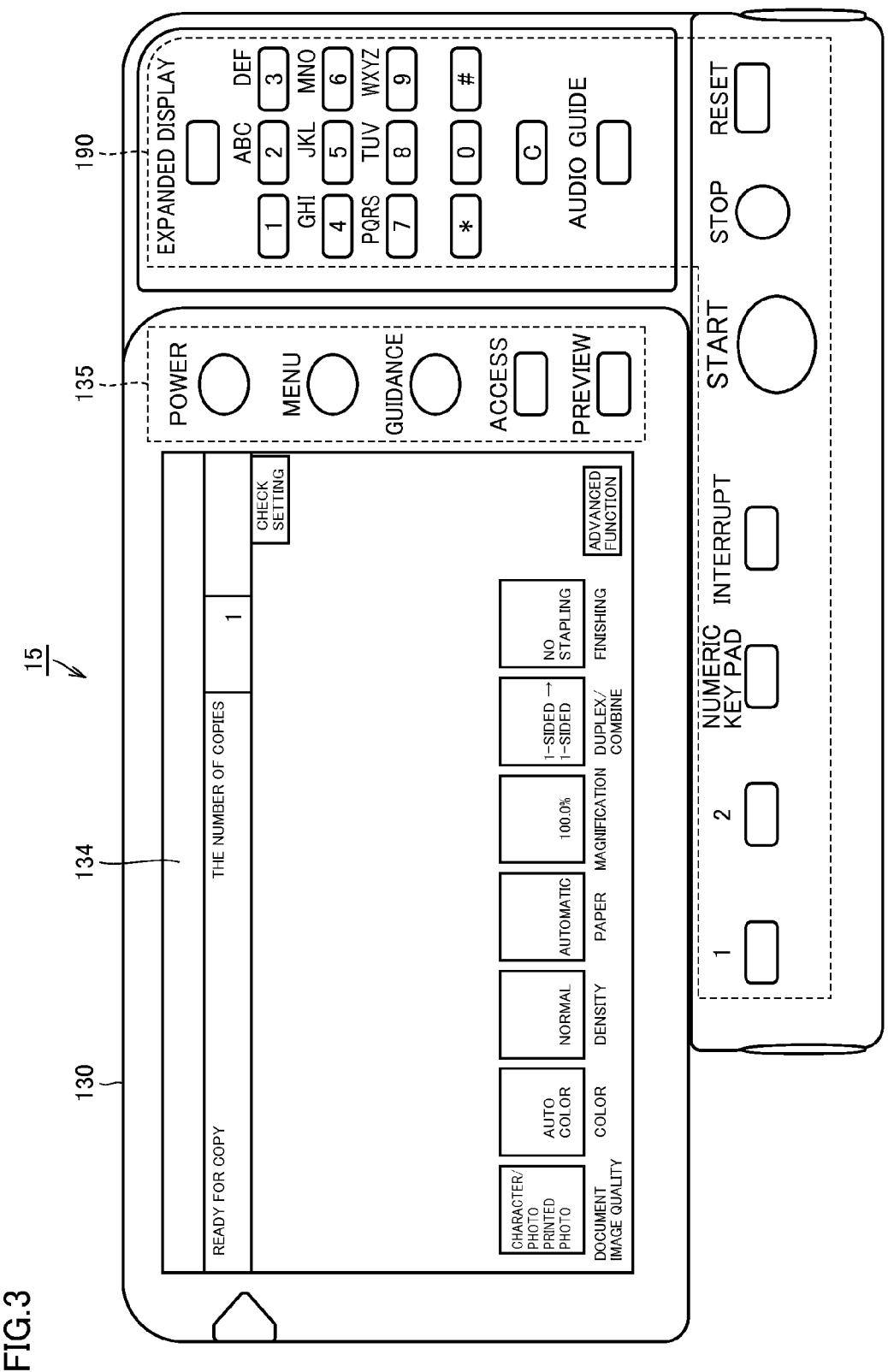
FIG. 3 is an enlarged view of an operation portion in FIG. 2.

FIG. 3 is an enlarged view of operation portion 15. A construction of operation portion 15 will be described with reference to FIG. 3.

As shown in FIG. 3, operation portion 15 includes hard key group 190 and operation panel 130 attachable to and removable from the main body of MFP 1. Display panel 134 and hard key group 135 are provided on an outer surface of operation panel 130. Display panel 134 is implemented by such a display device as a liquid crystal display device. Display control unit 132 controls a manner of display on display panel 134 in accordance with information input through an operation of hard key group 135 or other devices. In the present embodiment, display control unit 132 controls a manner of display on display panel 134 based on a control signal transmitted from CPU 101.

Hard key group 190 includes various keys such as numeric keys, a reset key, a stop key, and a start button of MFP 1. Hard key group 135 includes a power key, a menu key, a guidance key, and a preview key.

Figure 4:
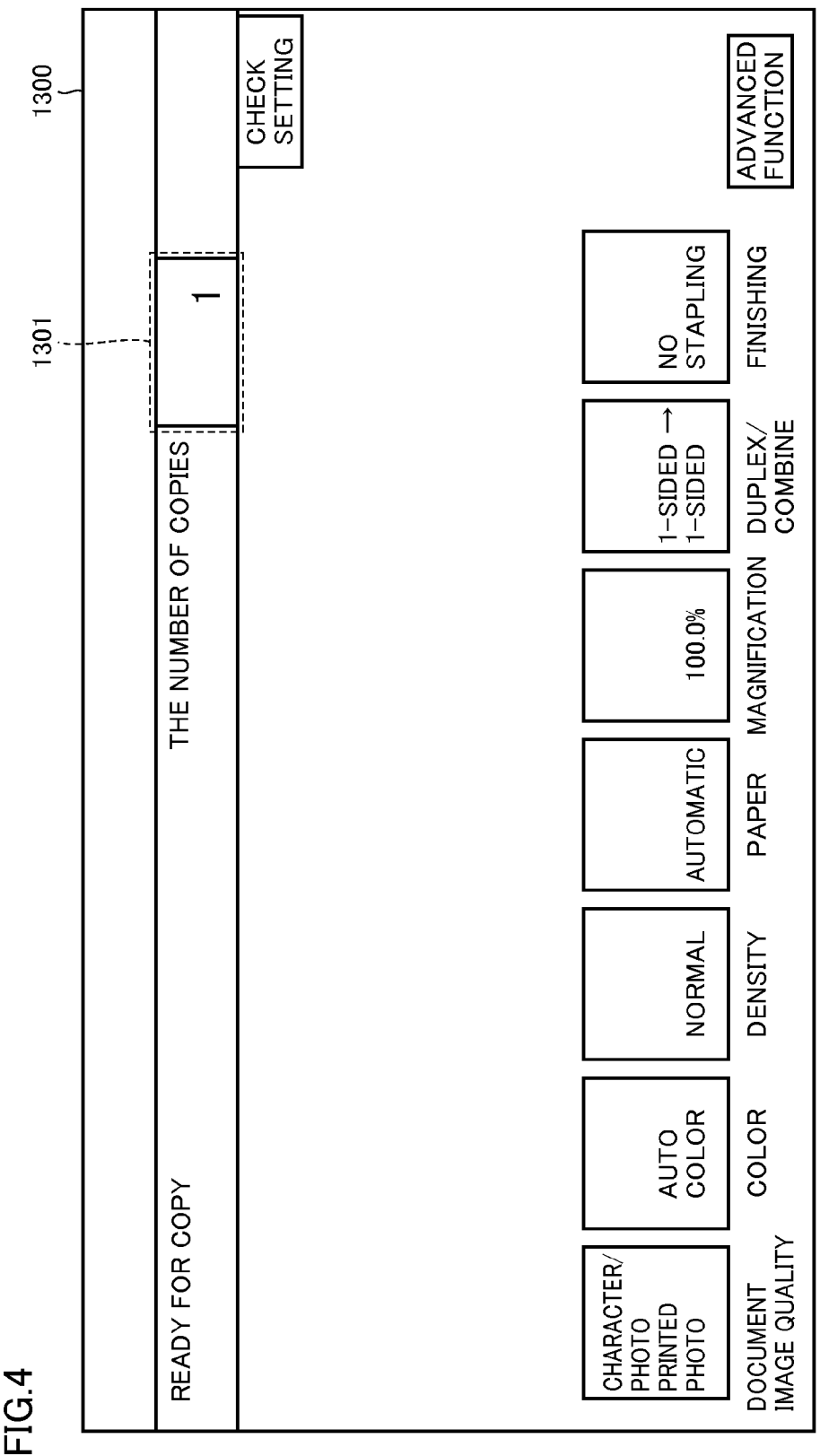
FIG. 4 is a diagram showing one example of a screen displayed on a display panel.

FIG. 4 is a diagram showing one example of a screen displayed on display panel 134. Referring to FIG. 4, a screen 1300 represents one example of a screen for standing by a printer operation. Screen 1300 displays a display field 1301 for displaying a value for the number of copies, together with a message "ready for copy." Touch pad 131 (FIG. 2) is provided in at least a part of display panel 134 as being superimposed thereon. Thus, when a touch operation is performed on display panel 134, touch pad 131 detects a position or the like of the touch operation. CPU 101 obtains a result of detection such as a position of a user's touch operation from touch pad 131. Touch pad 131 is implemented, for example, by a touch pad capable of multi-point sensing.

In the present embodiment, in touch pad 131, a region for accepting numeric value input (an "input area" which will be described later) is set. When a first finger of the user touches the region and thereafter a second finger touches the same, a value input in display field 1301 can be updated based on a manner of movement of a position of the second finger.

Processing for accepting input of a numeric value performed by MFP 1 (numeric value input processing) will now be described.

<Outlines of Numeric Value Input Processing>

Figure 5:
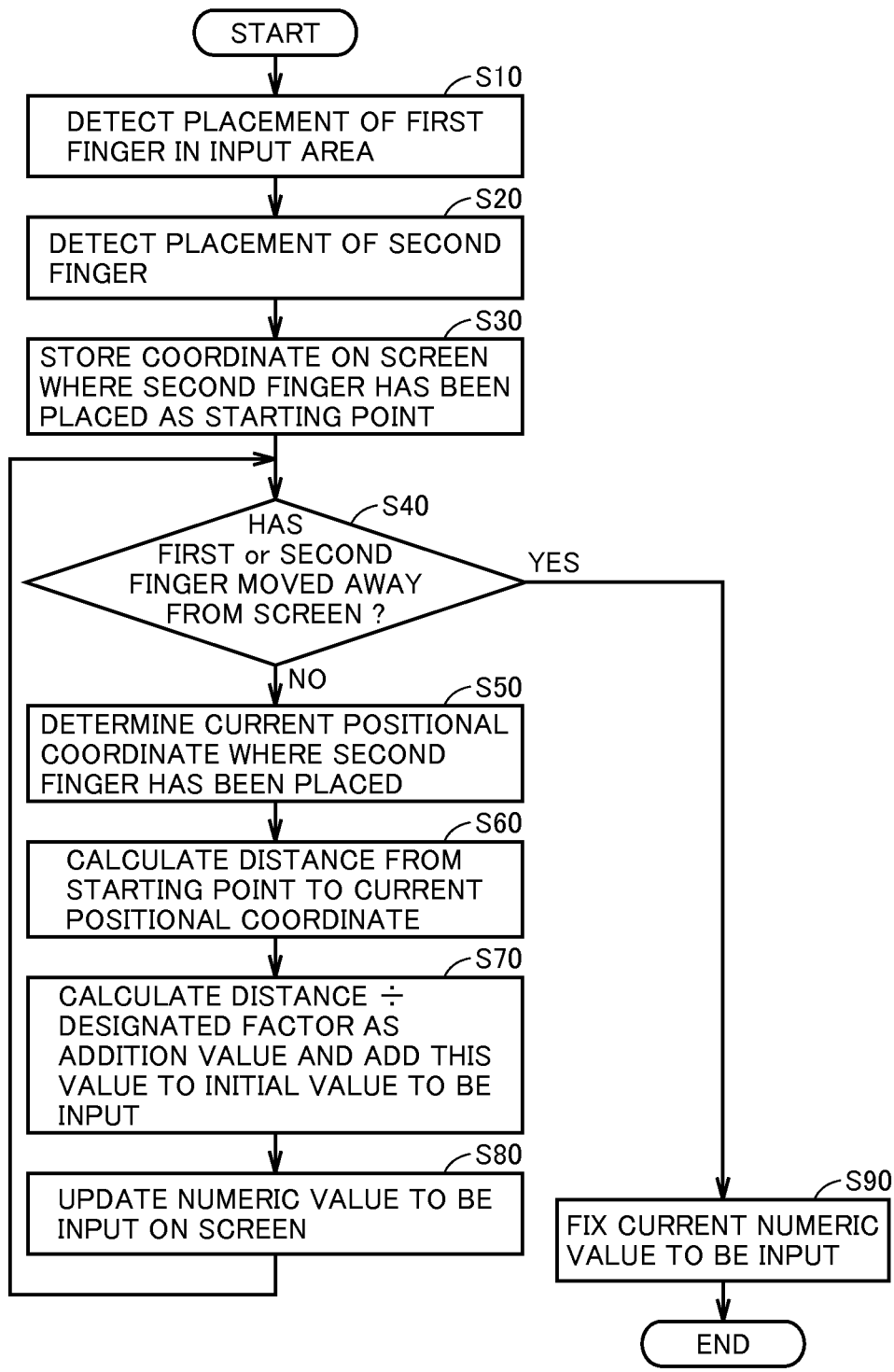
FIG. 5 is a flowchart of numeric value input processing performed in the MIT in FIG. 1.

FIG. 5 is a flowchart of numeric value input processing performed by CPU 101 in MFP 1 in the present embodiment. In addition, FIGS. 6A to 6E are diagrams showing a touch operation on display panel 134 and display contents in accordance therewith in the numeric value input processing.

Outlines of the numeric value input processing will be described initially with reference to FIG. 6A. In MFP 1, an "input area" which is an area made use of for an operation for updating an already input numeric value is set in at least a part of a detection region of touch pad 131. FIG. 6A shows the input area. In the present embodiment, an input area 50 is set to be the same as a field for displaying an input numeric value. Namely, input area 50 can be similar to display field 1301 in FIG. 4. FIG. 6A displays one example of an input numeric value ("1") in input area 50.

As the input area is thus set, the user can be caused to recognize the input area without separately displaying a graphic showing a region for accepting numeric value input on display panel 134. It is noted that the input area can be a location which is determined regardless of display contents on display panel 134 (for example, a region of 3-cm square at the upper right corner of display panel 134).

FIGS. 6A to 6E show with a graphic 51, a first finger performing a touch operation. In addition, a second finger performing the touch operation is shown with a graphic 52.

As shown in FIG. 6B, when the touch operation with the first finger is performed in input area 50, MFP 1 recognizes start of input for updating the numeric value. Specifically, touch pad 131 provided as being superimposed on display panel 134 detects the touch operation within the region corresponding to input area 50. In response thereto, CPU 101 recognizes that the touch operation was performed in input area 50.

Here, a manner of display of input area 50, such as a display color, may be changed. As a type of line delimiting input area 50 is different between FIG. 6B and FIG. 6A, change in manner of display is shown.

Then, as shown in FIG. 6C, when the touch operation with the second finger is performed on display panel 134, a coordinate where the touch operation with the second finger is started is stored as a starting point. It is noted that, in response to detection of the touch operation with the second finger, a manner of display of input area 50 (such as a display color) may further be changed. In FIG. 6C, a type of line delimiting input area 50 is further changed from that in FIG. 6A and FIG. 6B, so that change in manner of display of input area 50 is expressed.

Thereafter, the second finger is moved as shown in FIG. 6D. FIG. 6D shows with an arrow R1, an orientation of movement of the second finger. In MFP 1, a touch position of the second finger is detected periodically (for example, 5 msec) and then a distance between the starting point and the touch position is calculated. The calculated distance of movement is converted to a numeric value. Then, as the value is added to a numeric value to be input, the numeric value to be input is updated. The numeric value within input area 50 in FIG. 6D is updated by addition in correspondence with change in touch position of the second finger, as compared with FIG. 6C.

Namely, in the present embodiment, the numeric value is updated such that, as the distance of movement of the touch position of the second finger (a distance from the starting point) is longer, the input numeric value is greater.

It is noted that such updating of the numeric value in accordance with movement of the touch position of the second finger is carried out on condition that the touch operation by the first finger continues.

FIG. 6E shows such a state that the touch operation on display panel 134 is no longer performed. As the touch operation is no longer performed, a most recent value (updated value) is fixed as the numeric value.

Updating of the numeric value to be input in MFP 1 will more specifically be described. As described with reference to FIG. 4 or FIGS. 6A to 6E, when a numeric value to be input such as the number of copies is displayed on display panel 134, CPU 101 initially reads a value stored in NV-RAM 104 or the like as an initial value for the numeric value and causes S-RAM 103 to store the value. Then, CPU 101 causes display panel 134 to display the value stored in S-RAM 103 as the numeric value to be input.

Thereafter, as described with reference to FIG. 6C and FIG. 6D, when the touch position of the second finger is changed, the numeric value to be input is updated. In this case, CPU 101 updates the value stored in S-RAM 103. Thus, a displayed numeric value is also updated.

As described with reference to FIG. 6E, as the touch operation with the first finger and the second finger is no longer performed, the numeric value stored in S-RAM 103 is not updated until a next touch operation is performed. Therefore, similarly, a displayed numeric value is not updated.

It is noted that, in MFP 1, the numeric value to be input may be updated also by an operation other than the touch operation on display panel 134 as described with reference to FIGS. 6A to 6E (for example, an operation of the numeric keys in hard key group 190). In this case as well, similarly, CPU 101 updates the value stored in S-RAM 103 and updates a value to be displayed on display panel 134 in response thereto.

Then, when an instruction for a copy operation is accepted, CPU 101 sets a value stored in S-RAM 103 as the number of copies and generates job data for copying.

It is noted that, in the present specification, "change in touch position of the second finger" refers to what is called a dragging operation (an operation for changing a touch position while touch onto display panel 134 is kept) or a flicking operation (such an operation as flicking over the surface of display panel 134) with the second finger. In the description below, these operations may also collectively be called a dragging operation.

<Contents of Numeric Value Input Processing>

A flow of numeric value input processing will now be described with reference to FIG. 5. FIG. 5 is a flowchart of the numeric value input processing.

Initially, in step S10, CPU 101 detects placement of the first finger in input area 50. Then, CPU 101 causes the process to proceed to step S20.

In step S20, CPU 101 detects placement of the second finger in input area 50 or in a prescribed detection region provided around the same. As touch is detected at a position different from the position of detection of touch by the first finger, CPU 101 detects placement of the second finger. Then, CPU 101 causes the process to proceed to step S30.

In step S30, CPU 101 causes S-RAM 103 or the like to store a touch position of the second finger detected in step S20 (for example, a coordinate in the detection region of touch pad 131) as the starting point. Then, CPU 101 causes the process to proceed to step S40.

In step S40, CPU 101 determines whether or not at least any of the first finger and the second finger has moved away from the screen (display panel 134, or the detection region of touch pad 131). When CPU 101 determines that any finger has moved away, CPU 101 causes the process to proceed to step S90, and when it determines that neither of the fingers has moved away, CPU 101 causes the process to proceed to step S50. It is noted that CPU 101 makes determination in step S40 by determining whether or not the touch operation by any finger has also continued on touch pad 131 or the like.

In step S50, CPU 101 determines a current positional coordinate of the second finger. Then, CPU 101 causes the process to proceed to step S60. It is noted that CPU 101 handles a position of touch detected on touch pad 131 as the coordinate of the second finger, in addition to the position of touch detected in step S10.

In step S60, CPU 101 calculates a distance between the coordinate of the starting point stored in step S30 and the coordinate of the second finger detected in step S50. Then, CPU 101 causes the process to proceed to step S70.

In step S70, CPU 101 obtains an addition value by dividing the distance calculated in step S60 by a predetermined designated factor. Then, CPU 101 calculates a value obtained by adding the addition value above to the initial value of the numeric value to be input (hereinafter a "most recent value"). Then, CPU 101 causes the process to proceed to step S80.

In step S80, CPU 101 updates the value to be input stored in S-RAM 103 to the most recent value calculated in step S70. Then, CPU 101 returns the process to step S40.

On the other hand, in step S90, CPU 101 fixes the value stored in S-RAM 103 at that time point as the value to be input, and ends the numeric value input processing. Specifically, in step S90, CPU 101 stands by until a touch operation onto input area 50 is performed next.

According to the numeric value input processing described above with reference to FIG. 5, when the touch operation by the first finger is performed in input area 50, when the touch operation by the second finger is performed while the touch operation of the first finger continues, and when the second finger moves without moving away from display panel 134, the numeric value to be input is updated in accordance with a distance of movement thereof.

In the present embodiment, the processing in step S40 is preferably performed periodically (for example, 5 msec). Thus, the numeric value to be input is periodically updated in accordance with change in touch position of the second finger.

[Embodiment 2]

A hardware configuration of MFP 1 in the present embodiment can be similar to that in the first embodiment. Difference of MFP 1 in the present embodiment from the first embodiment will mainly be described hereinafter.

Figure 7:
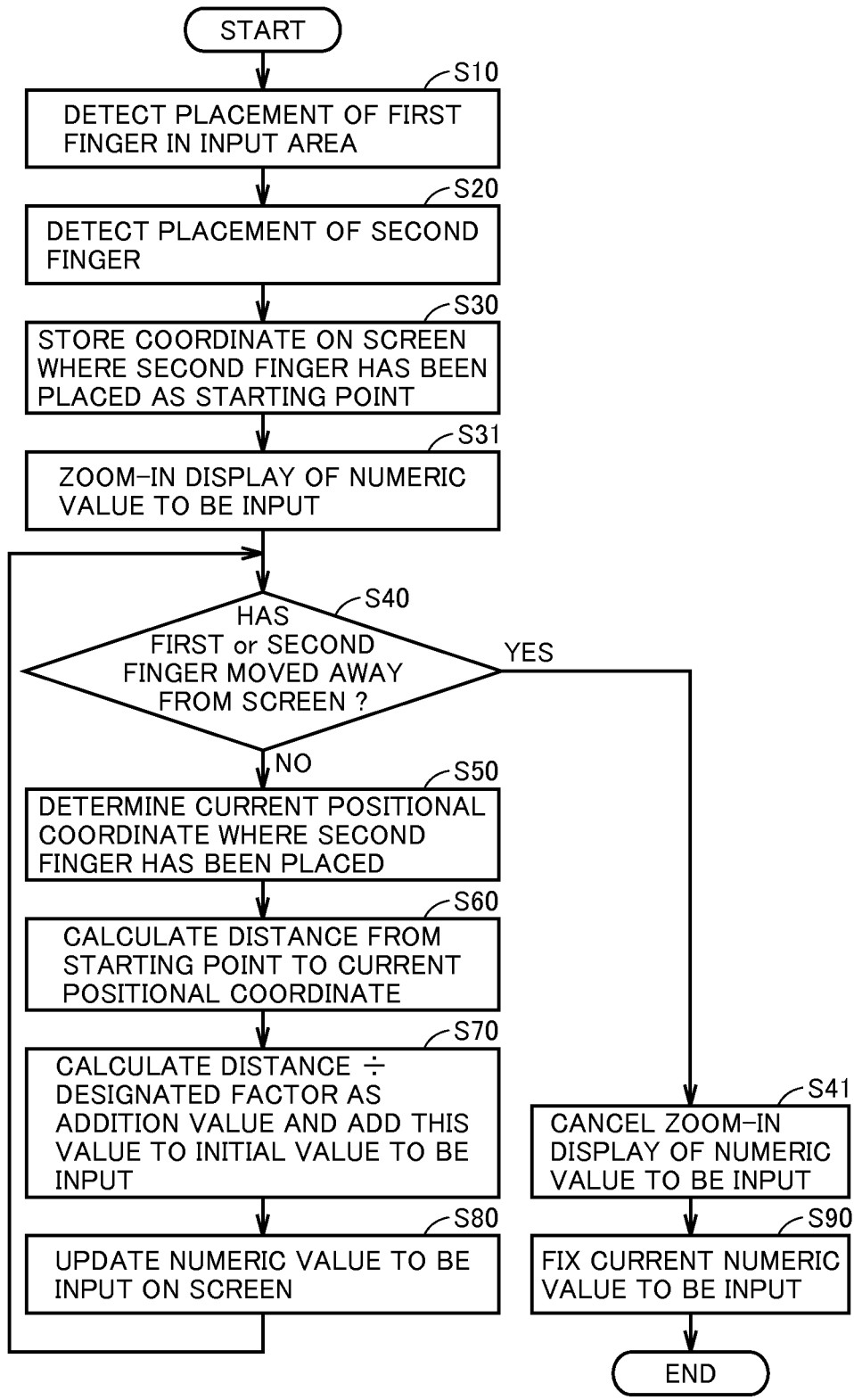
FIG. 7 is a flowchart of numeric value input processing performed in the MFP in a certain embodiment.

FIG. 7 is a flowchart of numeric value input processing performed in MFP 1 in a second embodiment. The numeric value input processing will be described hereinafter.

Referring to FIG. 7, in the numeric value input processing in the present embodiment, when CPU 101 detects placement of the first finger in input area 50, CPU 101 causes the process to proceed to step S20. When the CPU detects in step S20 placement of the second finger in input area 50 or a prescribed detection region provided around the same, CPU 101 causes the process to proceed to step S30. Then, in step S30, the CPU causes the coordinate in connection with the starting point of the second finger to be stored. In step S31, the numeric value to be input is displayed in a zoom-in manner, and the process proceeds to step S40.

Then, when CPU 101 determines in step S40 that any of the first finger and the second finger has moved away from the screen (display panel 134), CPU 101 causes the process to proceed to step S41.

In step S41, CPU 101 cancels zoom-in display in step S31 of the numeric value to be input, and CPU 101 causes the process to proceed to step S90.

Contents in each processing in step S40 to step S80 and step S90 in the present embodiment are the same as those in each corresponding step in the first embodiment.

Figure 8:
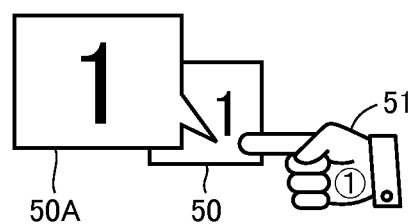
FIG. 8 is a diagram showing one example of a manner of display of a numeric value to be input on the display panel in the certain embodiment.

FIG. 8 is a diagram showing one example of a manner of display of a numeric value to be input on display panel 134 in the present embodiment. FIG. 8 shows together with input area 50, an input area 50A showing a state in which a manner of display of input area 50 has been changed.

Zoom-in display of the numeric value in step S31 in the present embodiment is realized, for example, as the manner of display of input area 50 is switched from input area 50 to input area 50A as shown in FIG. 8. In addition, cancellation of zoom-in display of the numeric value in step S41 is realized, for example, by switching the manner of display from input area 50A to input area 50.

It is noted that, in input area 50A, a numeric value displayed therein is displayed as zoomed-in as compared with display in input area 50.

Though the center of gravity is different between input area 50 and input area 50A in FIG. 8, the center of gravity of a graphic which is a frame where a numeric value is displayed does not have to be changed, that is, a position where a numeric value is displayed on display panel 134 does not have to substantially be changed, before and after change in manner of display.

In the present embodiment described above, during a period in which both of the touch operation by the first finger and the touch operation by the second finger continue, a numeric value to be input should only be displayed in a manner different from a manner during a period other than that, and the numeric value does not necessarily have to be displayed in a zoom-in manner. A manner of display may be changed by switching the manner of display between illumination and blinking or by switching a display color.

[Embodiment 3]

A hardware configuration of MFP 1 in the present embodiment can be similar to that in the first embodiment. Difference of MFP 1 in the present embodiment from the first embodiment will mainly be described hereinafter.

In the present embodiment, an upper limit value (a maximum value) is determined for an amount of change (from an initial value) in numeric value to be input. Though a numeric value to be input is updated in accordance with a distance of movement of the second finger in the present embodiment, when the second finger moves by a distance longer than a distance corresponding to the upper limit value above, the distance of movement equal to or longer than that is not substantially made use of for updating of the numeric value.

Figure 9:
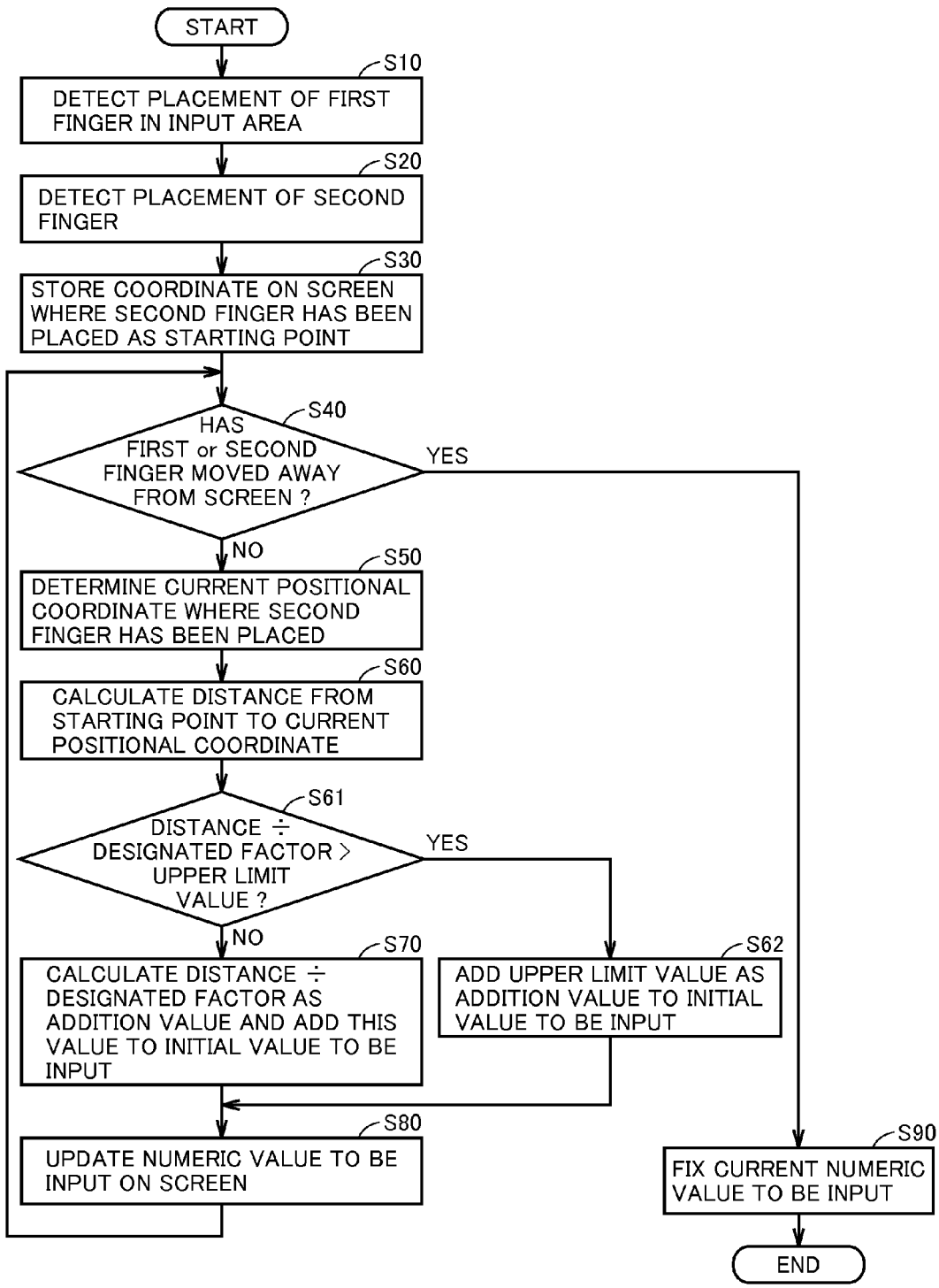
FIG. 9 is a flowchart of numeric value input processing in a certain embodiment.
Figure 10A:
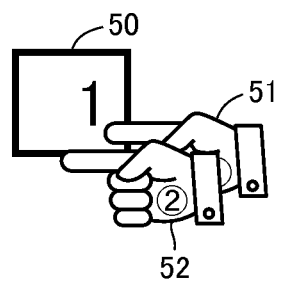
FIGS. 10A to 10C are diagrams for illustrating an operation on the display panel in the numeric value input processing in the certain embodiment.
Figure 10B:
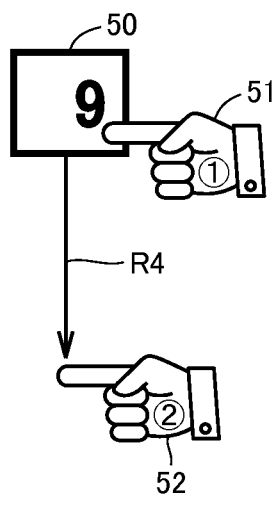
Figure 10C:
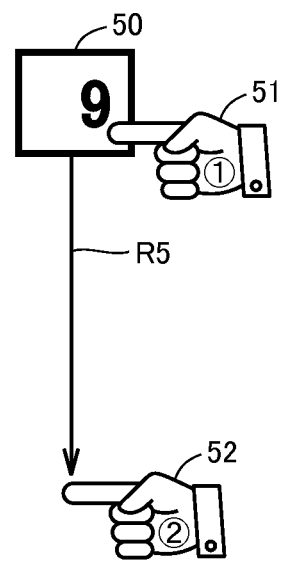

FIG. 9 is a flowchart of numeric value input processing in the present embodiment. FIGS. 10A to 10C are diagrams for illustrating an operation on display panel 134 in the numeric value input processing in the present embodiment. In the numeric value input processing in the present embodiment, each process in steps S10 to S60 is the same as each corresponding process in the numeric value input processing in the first embodiment described with reference to FIG. 5.

In the present embodiment, in step S60, CPU 101 calculates a distance from the starting point to the current position of the second finger. Then, in step S61, CPU 101 calculates the "addition value" mentioned in the first embodiment, and determines whether or not the addition value has exceeded an upper limit value predetermined for the addition value. Then, when CPU 101 determines that the addition value has exceeded the upper limit value, CPU 101 causes the process to proceed to step S62, and when CPU 101 determines that the addition value is not higher than the upper limit value, CPU 101 causes the process to proceed to step S70. It is noted that the upper limit value is stored, for example, in NV-RAM 104.

In step S62, CPU 101 calculates the "most recent value" by adding the upper limit value for the addition value to the initial value. Then, CPU 101 causes the process to proceed to step S80.

In the present embodiment, processing contents in the steps other than step

S61, step S62 are the same as in the first embodiment.

In the present embodiment described above, when the touch operation by the first finger is performed on display panel 134 as shown in FIG. 10A and then the touch operation by the second finger is performed, and in addition when the touch position of the second finger moves while the touch operation by the first finger continues as shown in FIG. 10B, the numeric value to be input is updated by addition in accordance with a distance of movement. It is noted that, when the distance of movement has exceeded the distance corresponding to the upper limit of an added value, the added value does not increase even though the distance of movement is longer than that. Namely, in the case where an arrow R4 in FIG. 10B indicates a distance corresponding to the upper limit value, even when the distance of movement of the second finger is longer than that as shown with an arrow R5 as shown in FIG. 10C, the updated value is set to a value the same as the value shown in FIG. 10B.

It is noted that the upper limit of the numeric value to be input may be stored instead of the upper limit value. In this case, CPU 101 calculates the upper limit value by subtracting the initial value from the upper limit of the numeric value to be input. For example, in the case where the upper limit of the number of copies is "9" and the initial value thereof is "1", the addition value is "8". Then, in this case, when a distance of movement of the second finger exceeds such a distance that the addition value is "8", a most recent value does not exceed the sum of the initial value and the upper limit value for the addition value even though the distance of movement is longer than that. Thus, updating of the numeric value to be input to a value exceeding the upper limit of that numeric value can be avoided.

[Embodiment 4]

A hardware configuration of MFP 1 in the present embodiment can be similar to that in the first embodiment. Difference of MFP 1 in the present embodiment from the first embodiment will mainly be described hereinafter.

In the present embodiment, as a numeric value to be input is greater, a unit distance of movement necessary for updating by addition of the numeric value to be input by "1" is decreased.

Figure 11:
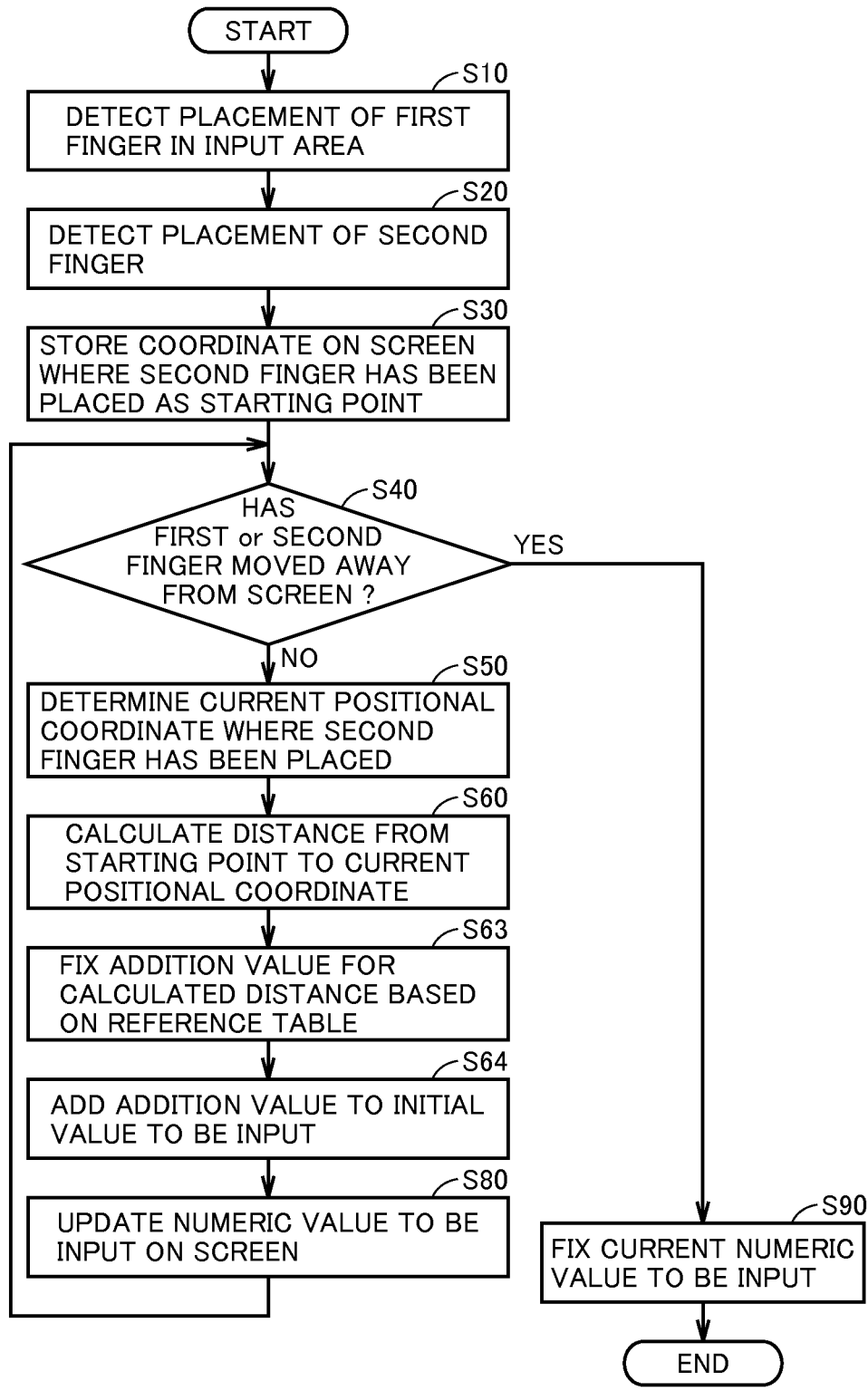
FIG. 11 is a flowchart of numeric value input processing in a certain embodiment.

FIG. 11 is a flowchart of numeric value input processing in the present embodiment. FIGS. 13A to 13D are diagrams for illustrating an operation on display panel 134 in the numeric value input processing in the present embodiment.

In the numeric value input processing in the present embodiment, each processing in steps S10 to S60, S80, and S90 is the same as each corresponding processing in the numeric value input processing in the first embodiment described with reference to FIG. 5. Then, instead of calculation of the addition value in step S70 in the first embodiment, the addition value is calculated in step S63 in the present embodiment.

Specifically, in the present embodiment, in step S60, CPU 101 calculates a distance of movement. Then, in step S63, CPU 101 obtains the addition value in accordance with the distance of movement by referring to a table for addition values stored in advance.

Then, in step S64, CPU 101 calculates a most recent value by adding the addition value obtained in step S63 to the initial value. Then, CPU 101 causes the process to proceed to step S80.

FIG. 12 shows one example of a table of addition values. In the example shown in FIG. 12, in the case where a distance of movement is from 1 to 9 (a unit of the distance of movement being, for example, millimeter), the addition value is set to "0", in the case where the distance of movement is from 10 to 14, the addition value is set to "1", in the case where the distance of movement is from 15 to 17, the addition value is set to "2", and in the case where the distance of movement is from 18 to 19, the addition value is set to "3". Namely, when the distance of movement changes from 0 to 10 (increase by 10), the addition value increases by 1. When the distance of movement changes from 10 to 15 (further increase by 5), the addition value further increases by 1. In addition, when the distance of movement changes from 15 to 18 (further increase by 3), the addition value further increases by 1. By thus bringing the distance of movement in correspondence with a numeric value, a numeric value frequently set by the user and a distance easy to operate can brought in correspondence with each other, and thus operability can be improved.

Relation between an addition value and a distance of movement in the present embodiment will be described with reference to FIGS. 13A to 13D. As shown in FIG. 13A, when the first finger touches a portion within input area 50, when the second finger touches display panel 134, and when the second finger moves therefrom by a distance D1 as shown in FIG. 13B, the numeric value in input area 50 is updated by addition by 1. A distance required for further updating of the numeric value by addition by 1 therefrom (a distance D2 in FIG. 13C) is shorter than distance D1. It is noted that an arrow R11 in FIG. 13B shows a trace of movement of the second finger from the starting point. Distance D1 indicates a length of arrow R11. In addition, an arrow R12 in FIG. 13C shows a trace of movement of the second finger from the starting point. A length of arrow R12 is the sum of distance D1 and distance D2.

Furthermore, a distance required for further updating of the numeric value displayed within input area 50 in FIG. 13C by addition by 1 (a distance D3 in FIG. 13D) is shorter than distance D2.

An arrow R13 in FIG. 13D shows a trace of movement of the second finger from the starting point. A length of arrow R13 is the sum of distance D1, distance D2, and distance D3.

[Embodiment 5]

A hardware configuration of MFP 1 in the present embodiment can be similar to that in the first embodiment. Difference of MFP 1 in the present embodiment from the first embodiment will mainly be described hereinafter.

In the present embodiment, when the touch operation by the first finger ends (the finger moves out of input area 50) before the touch operation by the second finger ends (the finger moves out of the detection region of touch pad 131), CPU 101 does not update a numeric value to be input. MFP 1 in the present embodiment will more specifically be described hereinafter with reference to FIG. 14 and FIGS. 15A to 15C.

Figure 14:
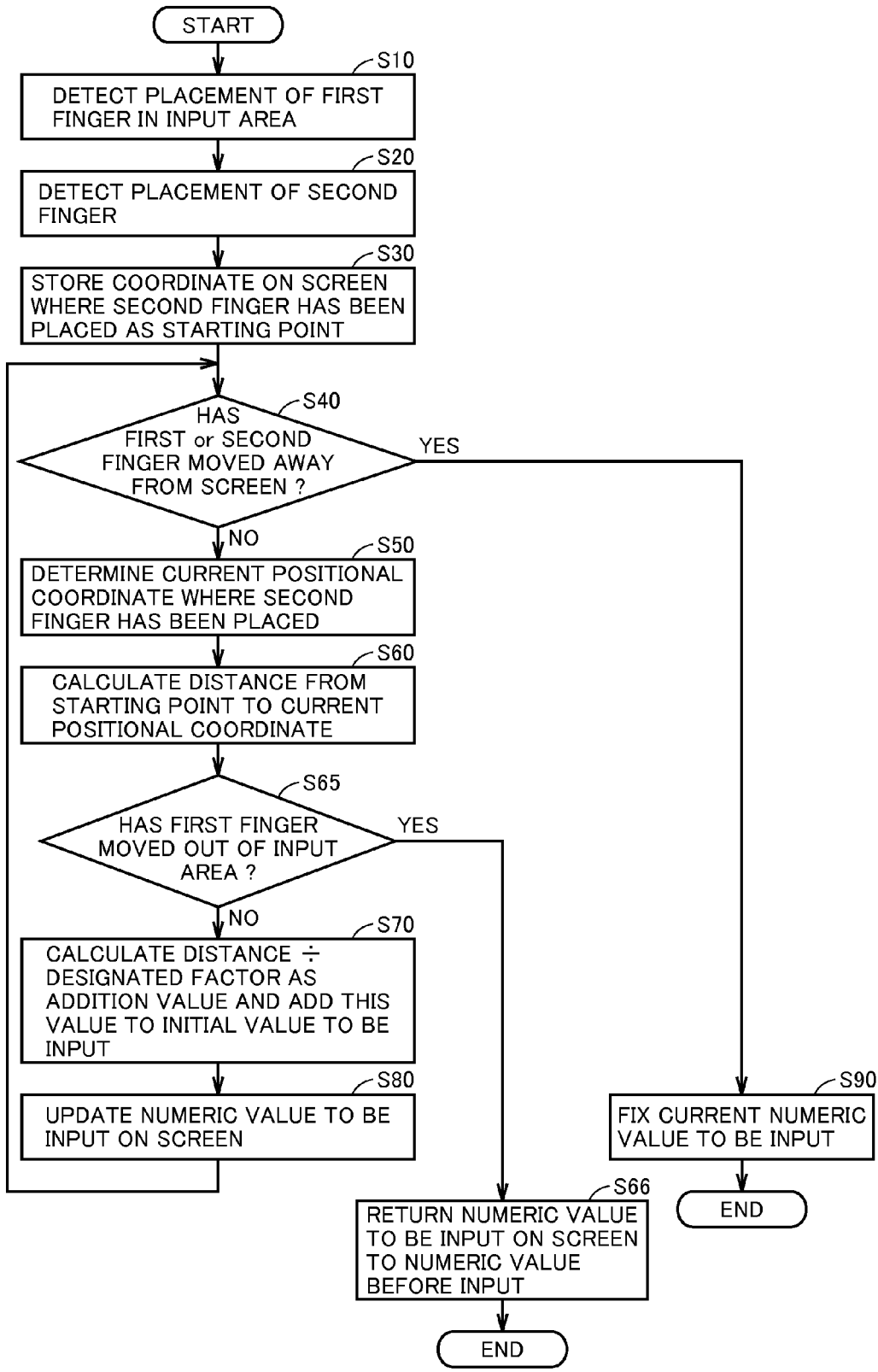
FIG. 14 is a flowchart of numeric value input processing in a certain embodiment.
Figure 15A:
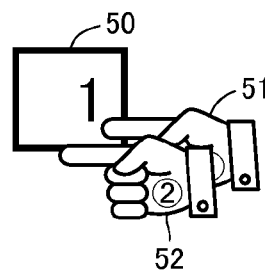
FIGS. 15A to 15C are diagrams for illustrating an operation on the display panel in the numeric value input processing in the certain embodiment.
Figure 15B:
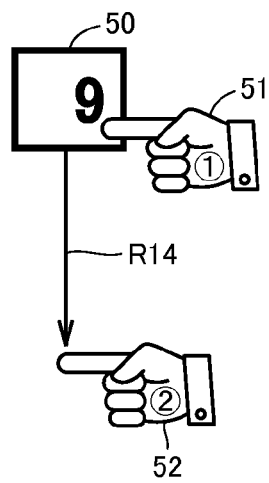
Figure 15C:
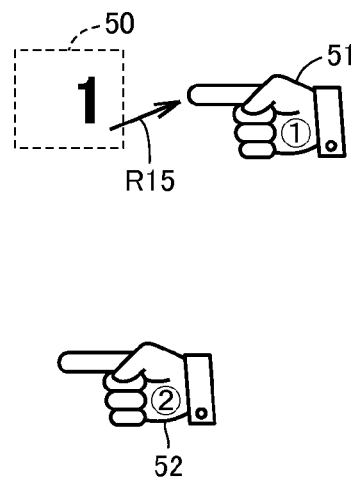

FIG. 14 is a flowchart of numeric value input processing in the present embodiment. FIGS. 15A to 15C are diagrams for illustrating an operation on display panel 134 in the numeric value input processing in the present embodiment.

In this numeric value input processing in the present embodiment, each processing in steps S10 to S60 and S90 is the same as each corresponding processing in the numeric value input processing in the first embodiment described with reference to FIG. 5. Then, in the present embodiment, after the distance of movement is calculated in step S60, CPU 101 determines in step S65 whether or not the touch position of the first finger has moved out of input area 50. Then, when CPU 101 determines that the touch position of the first finger has moved out of input area 50, CPU 101 causes the process to proceed to step S66, and when CPU 101 determines that the touch position has not moved out, CPU 101 causes the process to proceed to step S70.

In the numeric value input processing in the present embodiment, each process in steps S70 to S80 is the same as each corresponding process in the numeric value input processing in the first embodiment described with reference to FIG. 5. On the other hand, in step S66, CPU 101 returns the value to be input, which is stored in S-RAM 103, to a numeric value before step S10 is performed, and ends the numeric value input processing. Then, CPU 101 stands by until a next touch operation is performed on the input area.

In the present embodiment described above, when the first finger touches a portion within input area 50 as shown in FIG. 15A, thereafter when the second finger touches display panel 134, and thereafter when the second finger moves as shown in FIG. 15B, the numeric value within input area 50 is updated in accordance with a distance of movement or the like. It is noted that, in the present embodiment, as shown in FIG. 15C, when the touch position of the first finger moves out of input area 50 as shown with an arrow R15 before the second finger moves away from display panel 134, the numeric value within input area 50 is updated not to the value stored in S-RAM 103 at that time point but to a value at the time point of detection of touch of the first finger in that session, that is, at the time of start of the numeric value input processing this time.

It is noted that, in the present specification, the touch position of the first finger being positioned in input area 50 is referred to as a first touch operation. Then, as shown in FIG. 15C, in the case where a position of the first finger moves out of input area 50 while touch is kept, it is assumed that the first touch operation has ended.

Thus, even when a numeric value to be input has changed to a value considerably deviated from a target value, by removing the first finger before removing the second finger, such a considerably deviated value can be prevented from being fixed as a value to be input. Namely, updating of a value can be canceled. If a deviated value is fixed as the value to be input, an action (operation) for returning to a value close to a target value is required, and hence cancellation in the present embodiment can be concluded as effective. The target value is a value that the user intends to input.

It is noted that, in the present embodiment, in the case where the second finger is removed before the first finger, in step S90, the value stored in S-RAM 103 at that time point is fixed as the numeric value to be input.

[Embodiment 6]

A hardware configuration of MFP 1 in the present embodiment can be similar to that in the first embodiment. Difference of MFP 1 in the present embodiment from the first embodiment will mainly be described hereinafter.

In MFP 1 in the present embodiment, the user can set whether or not to update the numeric value to be input stored in S-RAM 103 to a predetermined initial value when touch by the first finger is detected in numeric value input processing.

Figure 16:
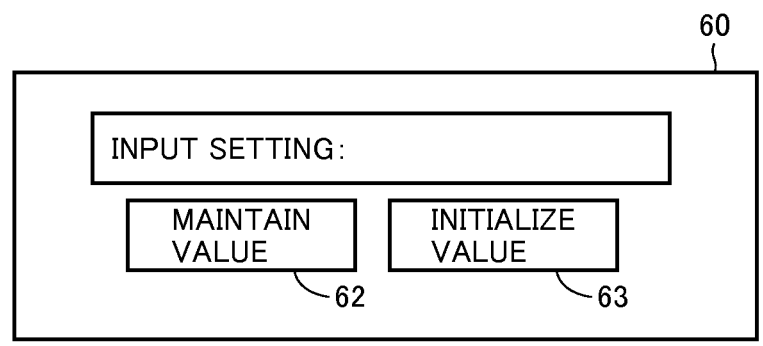
FIG. 16 is a diagram showing one example of a screen displayed on the display panel in a certain embodiment.

FIG. 16 shows one example of a screen displayed on display panel 134 for such setting. Such a screen is displayed, for example, when a prescribed menu is selected in MFP 1.

A screen 60 in FIG. 16 is a screen for input setting. Screen 60 includes a button 62 for maintaining a value and a button 63 for initializing a value. Depending on which of these buttons is operated, setting contents in MFP 1 are different and processing contents in the numeric value input processing also change.

Figure 17:
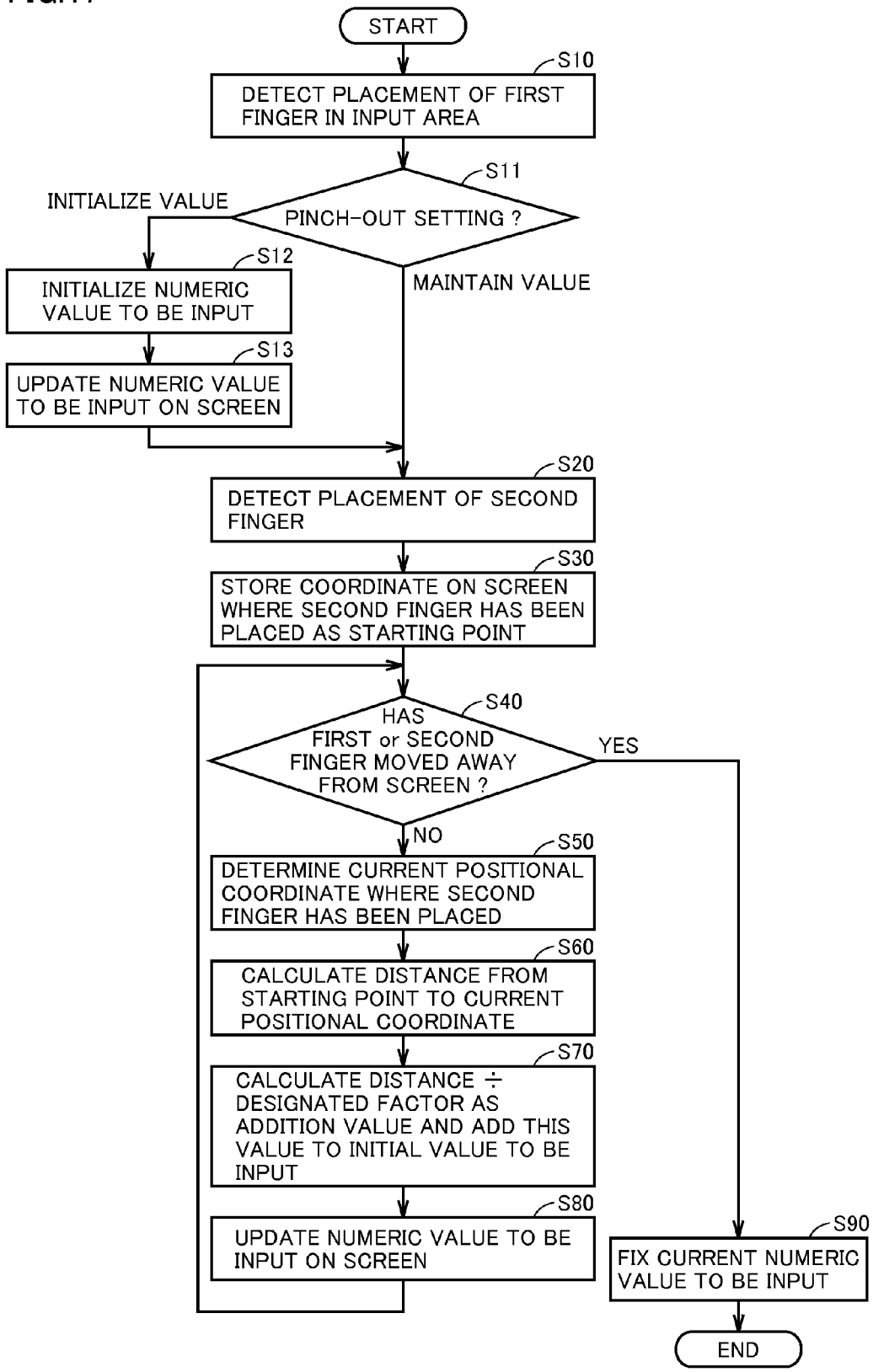
FIG. 17 is a flowchart of numeric value input processing in the certain embodiment.

FIG. 17 is a flowchart of the numeric value input processing in the present embodiment. In the present embodiment, when CPU 101 detects a touch operation within the input area in step S10, CPU 101 causes the process to proceed to step S11.

In step S11, CPU 101 check setting contents for pinch-out input setting as described with reference to FIG. 16. Then, if setting has been made to maintain a value (corresponding to button 62), CPU 101 causes the process to proceed to step S20. On the other hand, if setting has been made to initialize a value, CPU 101 causes the process to proceed to step S12.

In step S12, CPU 101 updates contents of storage in S-RAM 103 so as to initialize the numeric value to be input to the predetermined initial value. Then, CPU 101 causes the process to proceed to step S13.

In step S13, CPU 101 updates display of the numeric value to be input on display panel 134 based on display contents in updated S-RAM 103. Then, CPU 101 causes the process to proceed to step S20. CPU 101 performs as steps S20 to S90, processing similar to that in the corresponding steps in the first embodiment.

In the present embodiment described above, in the case where an operation for inputting a numeric value is performed in accordance with a property or the like of the numeric value to be input (setting item), whether to start processing after the numeric value is initialized or to start processing from the value stored at that time point can be set.

It is noted that whether to start processing after initialization or to start processing from the value stored at that time point may be set in advance for each type of numeric value to be input. FIG. 18 shows one example of such setting contents.

In FIG. 18, the number of copies refers to a numeric value defining the number of copies in printing. In addition, print layout refers to a numeric value defining a dimension of a margin in performing a print operation.

In the case where the setting contents as shown in FIG. 18 are stored in MFP 1, in step S11, CPU 101 obtains from the setting contents, setting corresponding to a type of a numeric value to be processed. Then, when the setting corresponding to the type of the numeric value is "to maintain a value," the process proceeds to step S20, and when the setting indicates "initial value", the process proceeds to step S12.

[Embodiment 7]

A hardware configuration of MFP 1 in the present embodiment can be similar to that in the first embodiment. Difference of MFP 1 in the present embodiment from the first embodiment will mainly be described hereinafter.

Figure 20A:
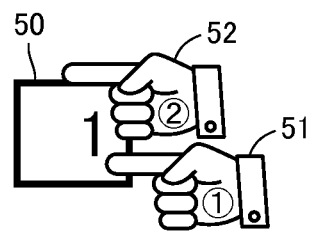
FIGS. 20A and 20B are diagrams for illustrating an operation on the display panel in the numeric value input processing in the certain embodiment.
Figure 20B:
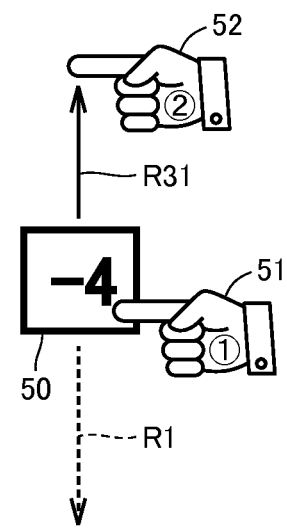

FIG. 19 is a flowchart of numeric value input processing in the present embodiment. FIGS. 20A and 20B are diagrams for illustrating an operation on display panel 134 in the numeric value input processing in the present embodiment.

Each embodiment described above mentioned only updating by addition of a numeric value to be input. The present embodiment also mentions updating by subtraction of the numeric value. In addition, in a step having a reference numeral the same as in the first embodiment in the numeric value input processing, processing the same as in the first embodiment is performed unless otherwise particularly mentioned.

In the numeric value input processing in the present embodiment, after the touch operation by the second finger is detected in step S20, CPU 101 determines in step S21 whether or not the touch position of the second finger is above the touch position of the first finger on display panel 134. Then, when the touch position of the second finger is under the touch position of the first finger, the process proceeds to step S30. When it is determined that the touch position of the second finger is above the touch position of the first finger, the process proceeds to step S22.

In step S22, CPU 101 sets a subtraction flag. Then, CPU 101 causes the process to proceed to step S30.

In addition, in the present embodiment, after CPU 101 calculates the distance of movement in step S60, CPU 101 determines in step S67 whether or not the subtraction flag has been set. Then, when it is determined that the subtraction flag has not been set, the process proceeds to step S70. When it is determined that the subtraction flag has been set, the process proceeds to step S68.

In step S68, CPU 101 calculates a most recent value by subtracting a value calculated as the addition value in the first embodiment from the initial value, and CPU 101 causes the process to proceed to step S80. Namely, in the present embodiment, a value obtained by dividing the distance calculated in step S60 by a predetermined designated factor is defined as a "subtraction value", and the most recent value is calculated by subtracting the subtraction value from the initial value.

According to the present embodiment described above, when the first finger touches input area 50 as shown in FIG. 20A and thereafter the second finger touches a portion thereabove on display panel 134 as shown in FIG. 20B, the numeric value to be input is updated such that a value in accordance with the distance of movement of the second finger is subtracted from the initial value. On the other hand, as shown with a dashed line in FIG. 20B, when touch by the second finger is made under the first finger, the numeric value to be input is updated such that a value in accordance with the distance of movement of the second finger is added to the initial value.

It is noted that updating by addition may be carried out when touch by the second finger is made above the first finger and updating by subtraction may be carried out when touch by the second finger is made under the first finger. Namely, relation between the touch positions of the second finger and the first finger and addition/subtraction should only be set as appropriate. In addition, such setting may be determined in accordance with a type of a numeric value to be input (the number of copies, a dimension of a margin, or the like).

[Embodiment 8]

A hardware configuration of MFP 1 in the present embodiment can be similar to that in the first embodiment. Difference of MFP 1 in the present embodiment from the first embodiment will mainly be described hereinafter.

Figure 22:
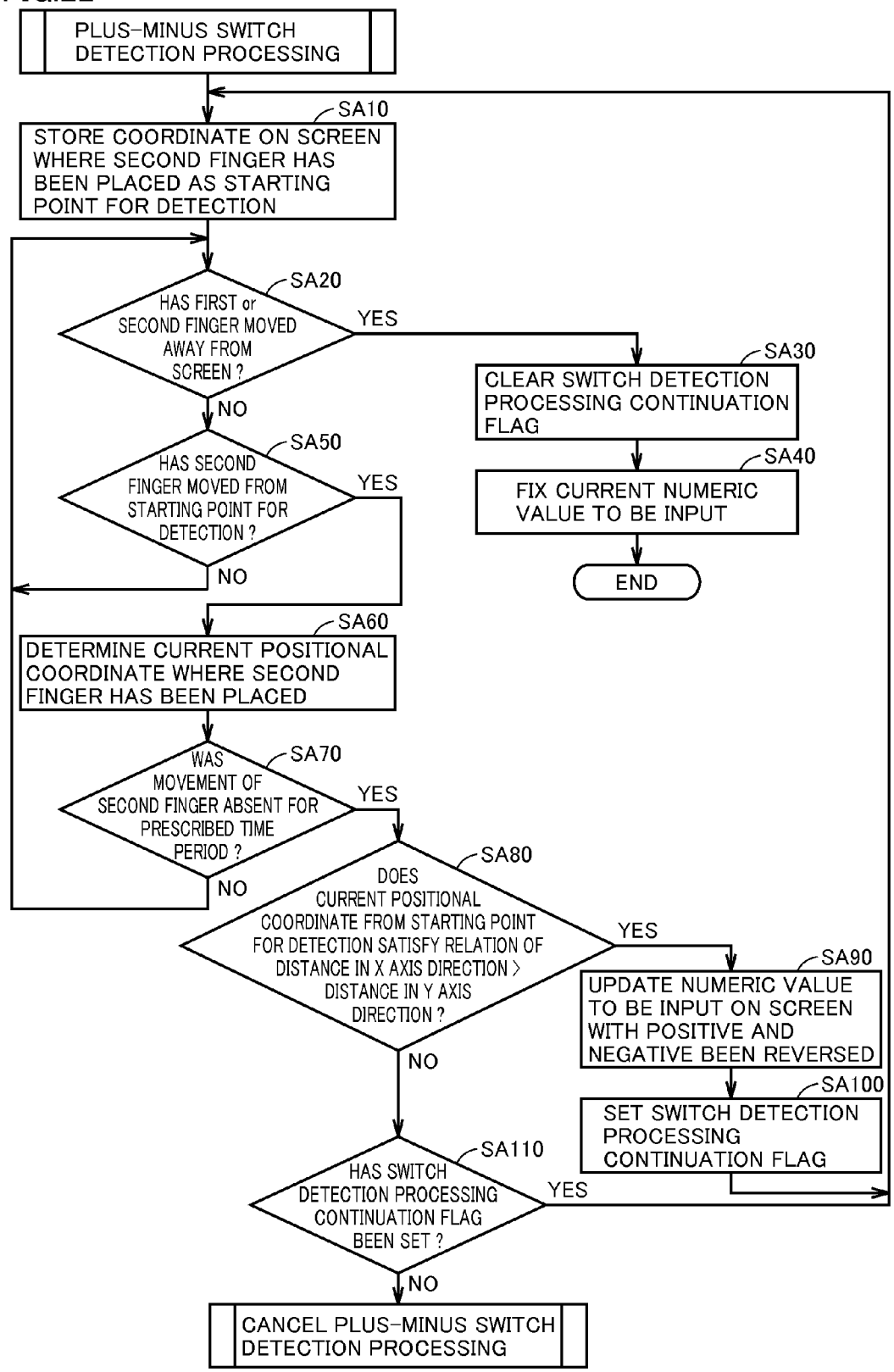
FIG. 22 is a flowchart of numeric value input processing in the certain embodiment.
Figure 23A:
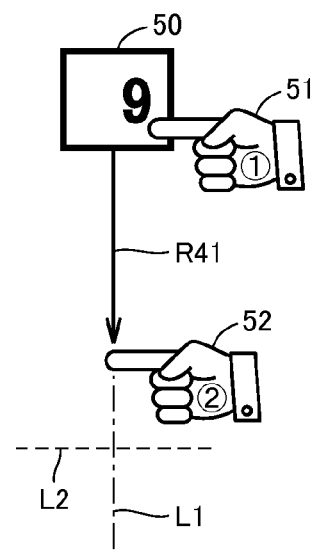
FIGS. 23A to 23C are diagrams for illustrating an operation on the display panel in the numeric value input processing in the certain embodiment.
Figure 23B:
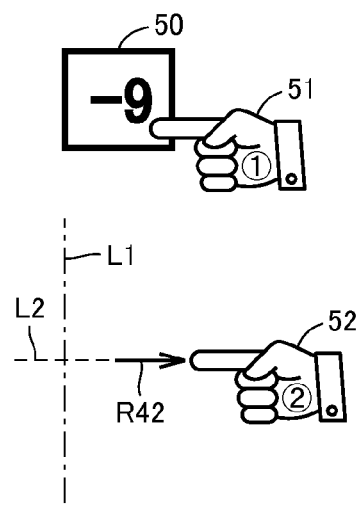
Figure 23C:
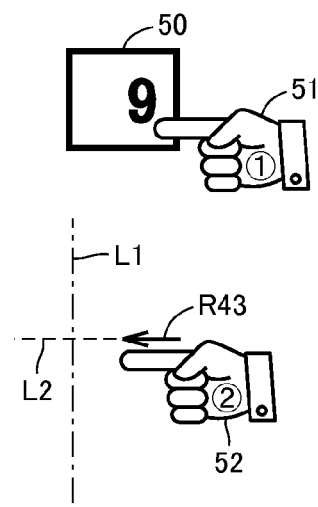

FIGS. 21 and 22 are flowcharts of numeric value input processing in the present embodiment. FIGS. 23A to 23C are diagrams for illustrating an operation on display panel 134 in the numeric value input processing in the present embodiment.

In the present embodiment, on condition that the touch position of the second finger did not move for a prescribed time period or longer (for example, a predetermined time period such as approximately 2 to 3 seconds), transition to a prescribed mode is made. In the prescribed mode, positive and negative of a numeric value to be input are switched in accordance with a direction of movement of the second finger. The present embodiment is effective in the case where a numeric value of which input is accepted can take any of positive and negative values, such as a case of a coordinate in setting a position where an operation button is displayed on display panel 134.

Namely, as shown in FIG. 23A, when the second finger has moved by a distance shown with an arrow R41 and thereafter the second finger continues to touch display panel 134 at that position without moving for a prescribed time period or longer, an operation mode of CPU 101 makes transition to the above-described prescribed mode.

In the examples shown in FIGS. 23A to 23C, two directions of a first direction shown with a line L1 and a second direction shown with a line L2 are defined as directions of movement. When the second finger moves in the first direction as shown in FIG. 23A and thereafter the second finger further moves in the second direction as shown with an arrow R42 in FIG. 23B or an arrow R43 in FIG. 23C, positive and negative of a numeric value to be input are switched.

Namely, when the second finger is moved along arrow R42 as shown in FIG. 23B, positive and negative of the numeric value within input area 50 are switched. When the second finger is further moved along arrow R43 as shown in FIG. 23C, positive and negative of the numeric value within input area 50 are further switched.

Processing contents in the present embodiment will be described hereinafter in further detail. Referring to FIG. 21, after the numeric value in S-RAM 103 is updated and display of the numeric value within input area 50 is updated in step S80, CPU 101 determines in step S 100 whether or not change in touch position of the second finger has been absent for a predetermined prescribed time period. Then, when it is determined that the touch position has been changed, the process returns to step S40, and when it is determined that the touch position has not been changed, transition to plus-minus switch detection processing is made.

FIG. 22 shows a flowchart of the plus-minus switch detection processing. In step SA10 in the plus-minus switch detection processing, CPU 101 detects a coordinate on the screen (display panel 134) on which the second finger was placed at that time point and causes the coordinate to be stored as the starting point. Then, CPU 101 causes the process to proceed to step SA20.

In step SA20, CPU 101 determines whether or not at least any of the first finger and the second finger has moved away from the screen (display panel 134) as in step S40. When it is determined that any finger has moved away, CPU 101 causes the process to proceed to step SA30. When it is determined that neither of the fingers has moved away, CPU 101 causes the process to proceed to step SA50.

In step SA30, CPU 101 clears a switch detection processing continuation flag (a flag set in step SA100 which will be described later). Then, CPU 101 causes the process to proceed to step SA40.

In step SA40, CPU 101 fixes the current numeric value to be input as in step S90. Then, CPU 101 ends the plus-minus switch detection processing and the numeric value input processing.

On the other hand, in step SA50, CPU 101 determines whether or not the second finger has moved from the starting point stored in step SA10. Then, when CPU 101 determines that the finger has moved, the process proceeds to step SA60, and when it is determined that the finger has not moved, the process returns to step SA20.

In step SA60, CPU 101 detects the current touch position of the second finger. Then, CPU 101 causes the process to proceed to step SA70.

In step SA70, CPU 101 determines whether or not such a state that the touch position of the second finger does not move for a prescribed time period has occurred. Then, when CPU 101 determines that the state above has occurred, CPU 101 causes the process to proceed to step SA80, and when CPU 101 determines that the state above has not occurred, CPU 101 causes the process to return to step SA20.

In step SA80, CPU 101 determines whether or not a distance of movement in a direction of an X axis (the second direction in FIGS. 23A to 23C) is longer than that in a direction of a Y axis (the first direction in FIGS. 23A to 23C), of the distance of movement from the starting point stored in step SA10 to the current touch position of the second finger. When CPU 101 determines that it is the case, the process proceeds to step SA90, and when CPU 101 determines that it is not the case, the process proceeds to step SA110.

In step SA90, CPU 101 updates the numeric value to be input, which is stored in S-RAM 103, with positive and negative being reversed, and in accordance therewith, CPU 101 updates display of the numeric value within input area 50.

Then, in step SA100, CPU 101 sets the switch detection processing continuation flag. Then, CPU 101 causes the process to return to step SA10.

In step SA 110, CPU 101 determines whether or not the switch detection processing continuation flag above has been set (not cleared after it is set). Then, when it is determined that the flag has been set, CPU 101 causes the process to return to step SA10. On the other hand, when it is determined that the flag has not been set (or cleared after it is set), CPU 101 cancels plus-minus switch sensing processing and causes the process to return to step S70 (FIG. 21).

[Embodiment 9]

A hardware configuration of MFP 1 in the present embodiment can be similar to that in the first embodiment. Difference of MFP 1 in the present embodiment from the first embodiment will mainly be described hereinafter.

Figure 24:
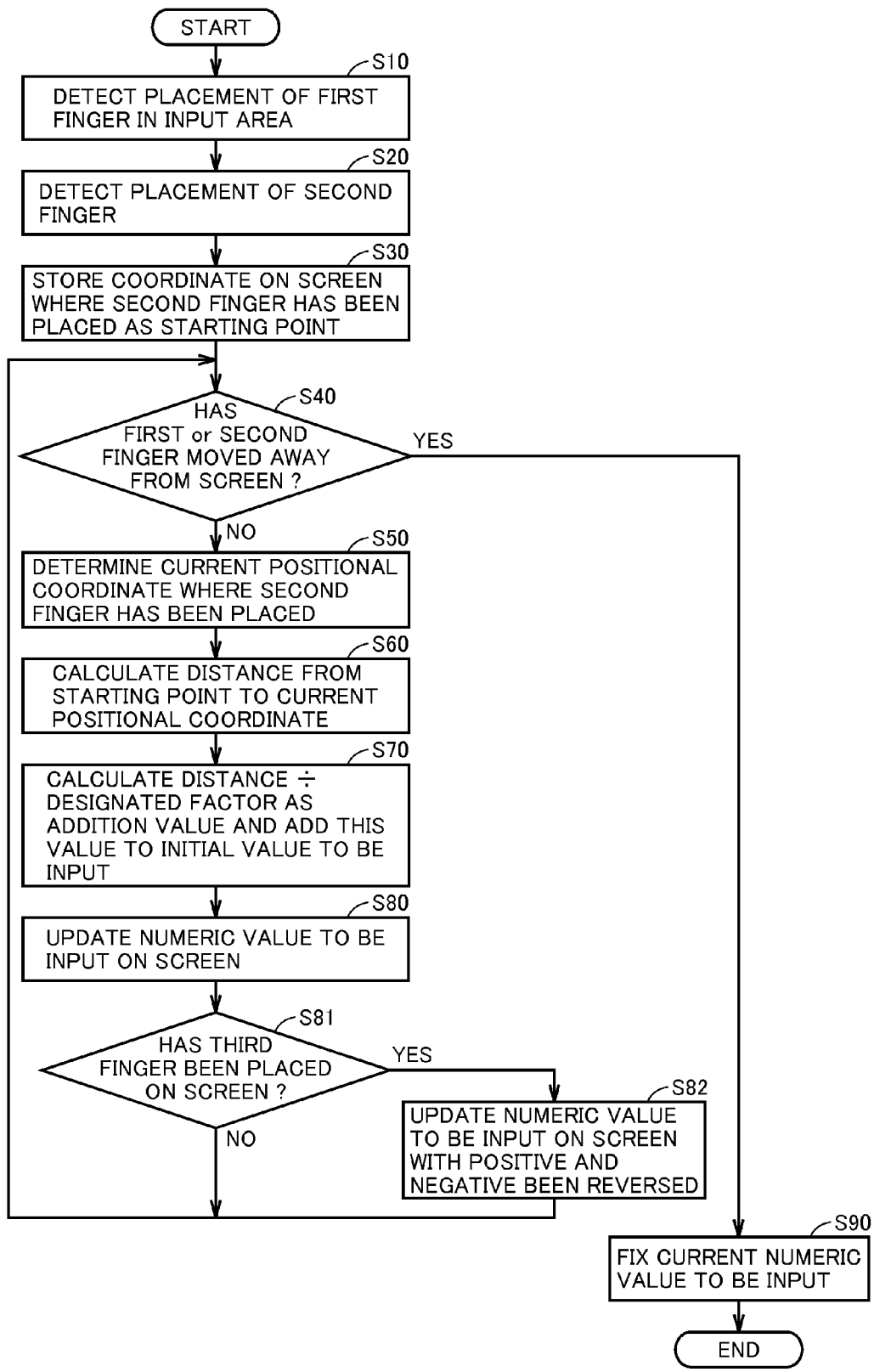
FIG. 24 is a flowchart of numeric value input processing in a certain embodiment.
Figure 25A:
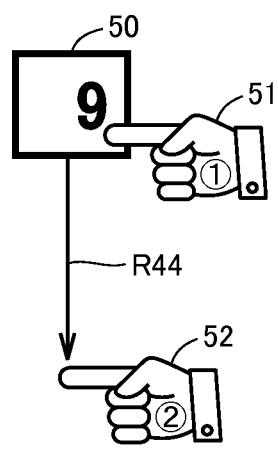
FIGS. 25A and 25B are diagrams for illustrating an operation on the display panel in the numeric value input processing in the certain embodiment.
Figure 25B:
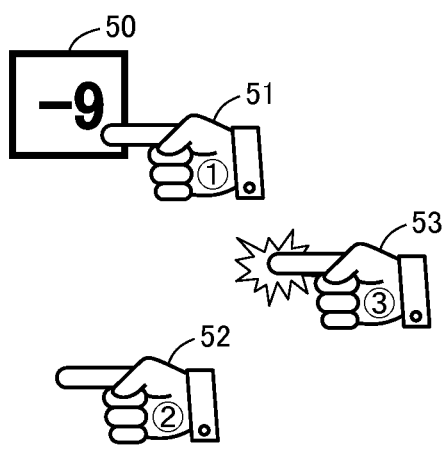

FIG. 24 is a flowchart of numeric value input processing in the present embodiment. FIGS. 25A and 25B are diagrams for illustrating an operation on display panel 134 in the numeric value input processing in the present embodiment.

In the numeric value input processing in the present embodiment, when the first finger touches as shown in FIG. 25A and thereafter the second finger touches, and when the touch position of the finger has been changed along an arrow R44 by dragging of the second finger and thereafter a third finger (expressed with a graphic 53 in this figure) touches display panel 134 as shown in FIG. 25B, positive and negative of the numeric value to be input are switched.

Specific processing contents will be described with reference to FIG. 24. In the numeric value input processing in the present embodiment, each processing in steps S10 to S80 and S90 is the same as each corresponding processing in the numeric value input processing in the first embodiment described with reference to FIG. 5.

In step S80, CPU 101 updates a value to be input which is stored in S-RAM 103 to a most recent value calculated in step S70. Then, CPU 101 causes the process to proceed to step S81.

In step S81, CPU 101 determines whether or not a touch operation by the third finger as described with reference to FIG. 25B has further been performed while the touch operation by the first and second fingers continue. When it is determined that such an operation has been performed, the process proceeds to step S82, and when it is determined that such an operation has not been performed, the process returns to step S40. Such determination can be made, for example, by determining whether or not the touch operation by the third finger has further been detected in addition to the touch operations by the first and second fingers on touch pad 131.

In step S82, CPU 101 updates the numeric value to be input which is stored in S-RAM 103 such that positive and negative thereof are reversed, and also further updates display of the numeric value displayed on display panel 134 similarly. Then, CPU 101 causes the process to return to step S40.

[Embodiment 10]

A hardware configuration of MFP 1 in the present embodiment can be similar to that in the first embodiment.

Difference of MFP 1 in the present embodiment from the first embodiment will mainly be described hereinafter.

In the present embodiment, CPU 101 receives input of numeric values for a plurality of digits, and then accepts input of a numeric value for each digit. FIGS. 26A to 26D are diagrams for illustrating an operation on display panel 134 in numeric value input processing in the present embodiment.

In the present embodiment, an input area is displayed on display panel 134 for each digit. FIG. 26A shows an example where numeric values for three digits are input. FIG. 26A shows input areas 50A, 50B, 50C which are input areas for the numeric values for three digits, respectively. Numeric values are displayed in input areas 50A, 50B, 50C, respectively. Specifically, a numeric value "0" for the hundredth place is displayed in input area 50A, a numeric value "0" for the tenth place is displayed in input area 50B, and a numeric value "1" for the one place is displayed in input area 50C.

In the present embodiment, NV-RAM 104 stores a detection region of touch pad 131 corresponding to an input area for each digit (input areas 50A, 50B, 50C). Then, when the touch operation by the first finger is performed, CPU 101 determines in which region of these regions the operation has been performed, and determines the digit corresponding to the operated region as the digit of interest of input. For example, as shown in FIG. 26B, when it is determined that the touch operation by the first finger is the operation within the region corresponding to input area 50B, CPU 101 determines the numeric value in the second digit among the numeric values to be input, which are stored in S-RAM 103, as the numeric value to be input, and then CPU 101 proceeds with processing in step S10 (FIG. 5 and the like).

Thereafter, when the touch operation by the second finger is performed while the touch operation by the first finger continues as shown in FIG. 26C and in addition the touch position of the second finger moves as shown with an arrow R51 as shown in FIG. 26D, a numeric value for a digit determined as being of interest of input among the numeric values to be input, which are stored in S-RAM 103, is updated in accordance with the distance of movement, and the numeric value displayed in the input area (input area 50B) is updated.

It is noted that, in the present embodiment, the upper limit value is set for the addition value as in step S61 (FIG. 9). Specifically, an upper limit for each digit ("9" in the case of a decimal number) is set as the upper limit value for the addition value.

In addition, in the present embodiment, the detection region of touch pad 131 corresponding to an input area for each digit may be recorded in a program executed by CPU 101, instead of being stored in NV-RAM 104.

[Embodiment 11]

A hardware configuration of MFP 1 in the present embodiment can be similar to that in the first embodiment. Difference of MFP 1 in the present embodiment from the first embodiment will mainly be described hereinafter.

Figure 27:
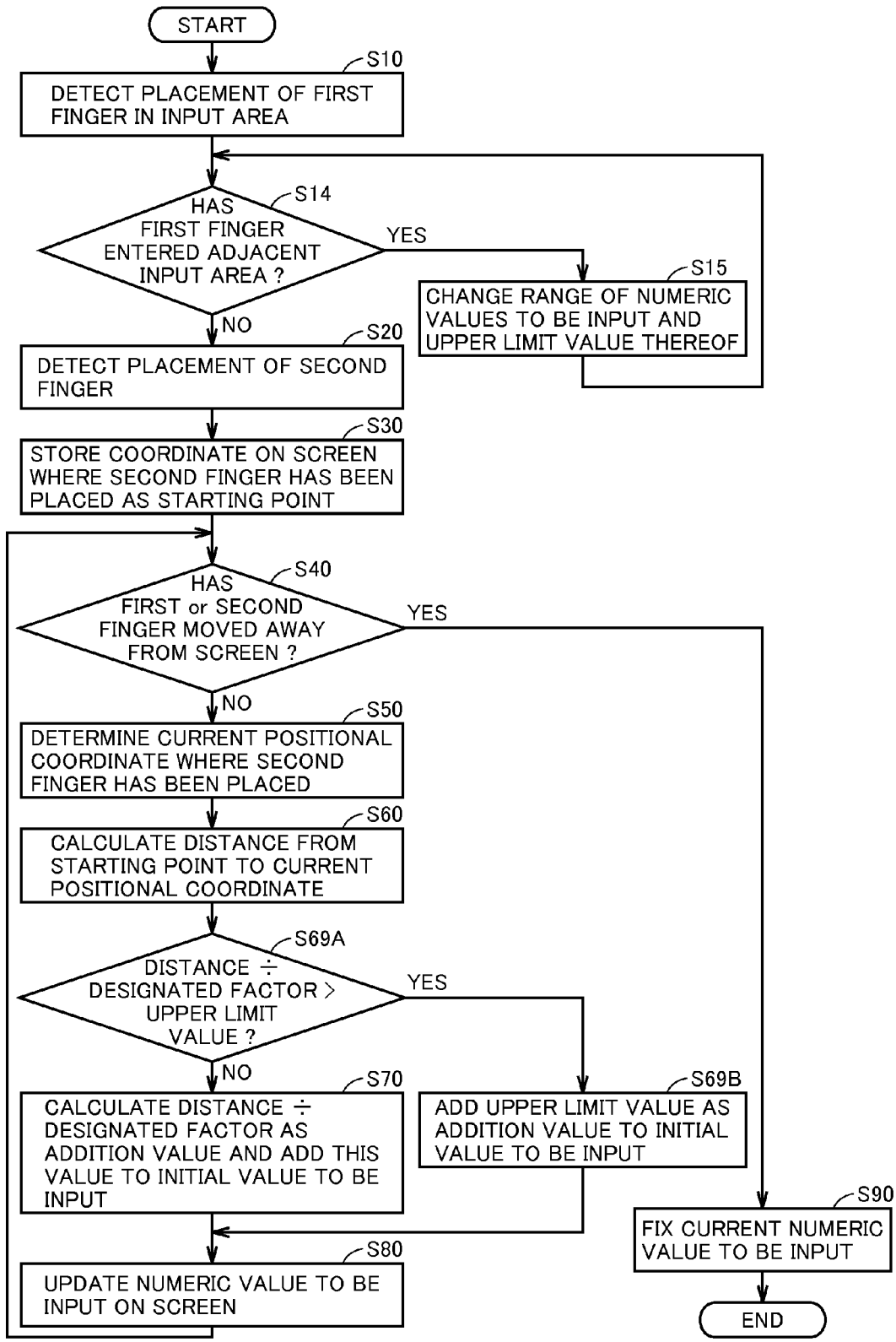
FIG. 27 is a flowchart of numeric value input processing in a certain embodiment.

FIG. 27 is a flowchart of numeric value input processing in the present embodiment. FIGS. 28A to 28C are diagrams for illustrating an operation on display panel 134 in the numeric value input processing in the present embodiment.

In MFP 1 in the present embodiment, as in MFP 1 in Embodiment 10, a plurality of digits are set for numeric values to be input, and a digit of interest of input among the numeric values is determined depending on a position of the touch operation by the first finger. In addition, in MFP 1 in the present embodiment, when the first finger is dragged, all digits included in a range of operation of the first finger designated by the dragging operation are determined as digits of interest of input. Specifically, as shown in FIG. 28A, when the touch operation by the first finger is performed in input area 50B and thereafter a region touched in the dragging operation by the first finger reaches input area 50C, not only a digit in the tenths place corresponding to input area 50B but also a digit in the one place corresponding to input area 50C are determined as the digits of interest of input. In FIG. 28C, as compared with FIG. 28B, numeric values in three digits displayed in input areas 50A to 50C are changed from 1 to 24. Namely, in this example, a two-digit numeric value can be input depending on a distance of the touch operation by the second finger.

Contents of the numeric value input processing in the present embodiment will now be described with reference to FIG. 27. CPU 101 detects in step S10, the touch operation of the first finger in a region corresponding to any of input areas 50A to 50C. Then, CPU 101 causes the process to proceed to step S14.

In step S14, CPU 101 determines whether or not the touch position of the first finger has thereafter entered an input area adjacent to the input area detected so far, as a result of the dragging operation. Then, when CPU 101 determines that the touch position of the first finger has entered the input area above, CPU 101 causes the process to proceed to step S 15, and when it determines that the touch position of the first finger has not entered the input area, CPU 101 causes the process to proceed to step S20.

In step S15, CPU 101 changes a range of numeric values to be input to the upper limit value including an input region in which the first finger has been determined in step S14 as having entered, and CPU 101 causes the process to return to step S14. Namely, in the case where one digit has been of interest of input so far, the upper limit value has been set to "9", however, it is updated to "99" which is an upper limit value for two digits. It is noted that, in the case where two digits have been of interest of input so far, the upper limit value has been "99", however, as a result of processing in step S15, the upper limit value is updated to "999" for three digits.

In this numeric value input processing in the present embodiment, each process in steps S20 to S60 is the same as each corresponding process in the numeric value input processing in the first embodiment described with reference to FIG. 5.

Then, CPU 101 calculates in step S60 a distance from the starting point to the current position of the second finger. Then, in step S69A, CPU 101 calculates the "addition value" mentioned in the first embodiment, and determines whether or not the addition value has exceeded the upper limit value set in step S15. When it is determined that the addition value has exceeded the upper limit value, the process proceeds to step S69B, and when it is determined that the addition value is equal to or lower than the upper limit value, the process proceeds to step S70.

In step S69B, CPU 101 calculates a "most recent value" by adding the upper limit value for the addition value to the initial value. Then, CPU 101 causes the process to proceed to step S80.

[Embodiment 12]

A hardware configuration of MFP 1 in the present embodiment can be similar to that in the first embodiment. Difference of MFP 1 in the present embodiment from the first embodiment will mainly be described hereinafter.

Figure 29:
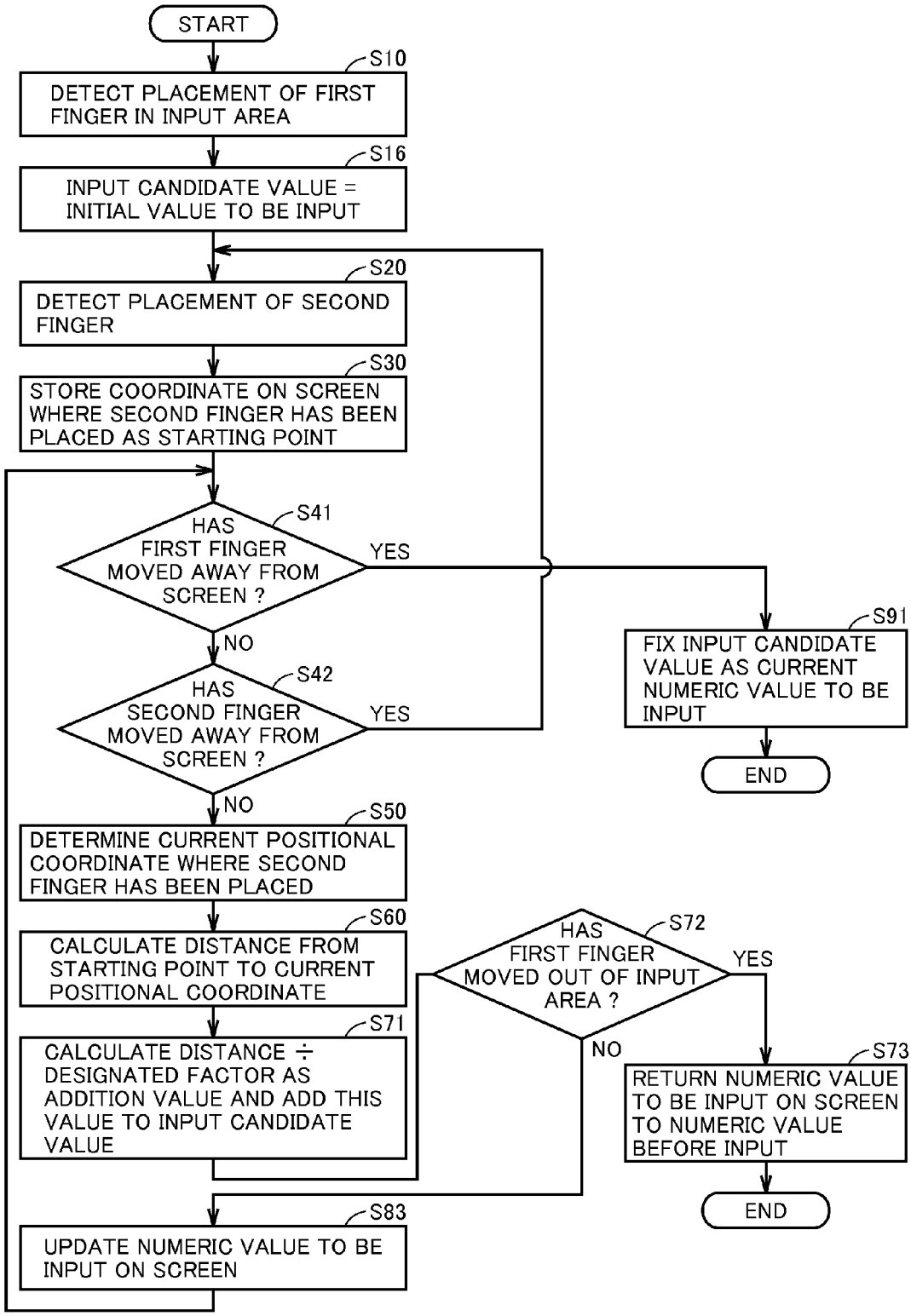
FIG. 29 is a flowchart of numeric value input processing in a certain embodiment.
Figure 30A:
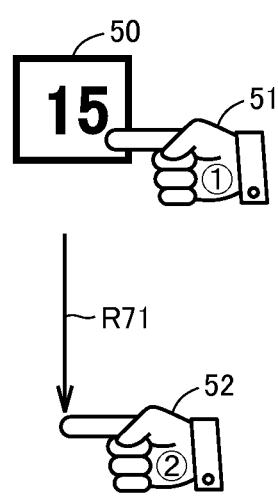
FIGS. 30A and 30B are diagrams for illustrating an operation on the display panel in the numeric value input processing in the certain embodiment.
Figure 30B:
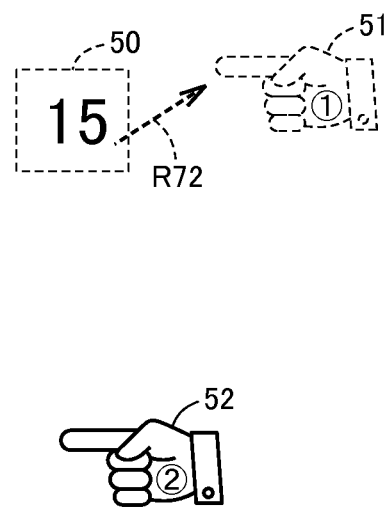

FIG. 29 is a flowchart of numeric value input processing in the present embodiment. FIGS. 30A and 30B are diagrams for illustrating an operation on display panel 134 in the numeric value input processing in the present embodiment.

In MFP 1 in the present embodiment, a numeric value to be input is successively added by repeating a flicking operation of the second finger while the first touch operation is maintained as shown in FIG. 30A. Then, when the first finger moves away from display panel 134 as shown in FIG. 30B, an input value is fixed. It is noted that, when the first finger moves away from display panel 134 before the second finger moves away from display panel 134, a numeric value to be input is returned to a value before the first touch operation is performed.

Contents in the numeric value input processing in the present embodiment will be described with reference to FIG. 29. In the numeric value input processing in the present embodiment, when touch to the input area by the first finger is detected in step S10, in step S16, CPU 101 causes S-RAM 103 to store a value stored in advance in NV-RAM 104 or the like as an input candidate value for the numeric value to be input, updates display of the numeric value to be input on display panel 134 to the input candidate value, and causes the process to proceed to step S20.

Then, CPU 101 senses the touch operation by the second finger in step S20, and causes S-RAM 103 to store that touch position as the starting point in step S30. Then, CPU 101 causes the process to proceed to step S41.

In step S41, CPU 101 determines whether or not the first finger has moved away from display panel 134. When it is determined that the first finger has moved away, the process proceeds to step S91, and when it is determined that the first finger has not moved away, the process proceeds to step S42.

In step S42, CPU 101 determines whether or not the second finger has moved away from display panel 134. When it is determined that the second finger has moved away, the process proceeds to step S20, and when it is determined that the second finger has not moved away, the process proceeds to step S50.

CPU 101 detects the current touch position of the second finger in step S50, and calculates in step S60 a distance from the starting point to the current position detected in step S50. Then, CPU 101 causes the process to proceed to step S71.

In step S71, CPU 101 calculates the addition value as in step S70 (FIG. 5 and the like) and updates the input candidate value by adding the addition value. Then, CPU 101 causes the process to proceed to step S72.

In step S72, CPU 101 determines whether or not the first finger has moved away from display panel 134. When it is determined that the first finger has moved away from display panel 134, the process proceeds to step S73, and when it is determined that the first finger has not moved away, the process proceeds to step S83.

In step S73, CPU 101 returns display of the numeric value to be input on display panel 134 to the value before updating in step S16. Then, CPU 101 ends the process. In this case, even though the input candidate value has been updated in step S73 by that time, a numeric value to be input itself is not updated.

On the other hand, in step S83, CPU 101 updates display of the numeric value to be input on display panel 134 to the input candidate value updated in step S73. Then, CPU 101 causes the process to return to step S41.

In step S91, CPU 101 updates the numeric value to be input in S-RAM 103 with the input candidate value at that time point, instead of step S90 in FIG. 5 and the like. Then, CPU 101 ends the process.

In the present embodiment described above, when the first finger has moved away from display panel 134 before the second finger moves away from display panel 134, in step S73, the numeric value to be input is maintained to the numeric value before the processing shown in FIG. 29 is preformed.

On the other hand, when the first finger has moved away from display panel 134 after the second finger moved away from display panel 134, the numeric value to be input is updated to the input candidate value at that time point. It is noted that the input candidate value is updated by addition, depending on a distance of movement each time the second finger performs a dragging operation (flicking operation) until the first finger moves away.

[Embodiment 13]

A hardware configuration of MFP I in the present embodiment can be similar to that in the first embodiment. Difference of MFP 1 in the present embodiment from the first embodiment will mainly be described hereinafter.

MFP 1 in the present embodiment can accept an operation involved with change in distance between touch positions of two fingers on display panel 134, i.e., what is called a pinch-in operation which is decrease in distance between touch positions of two fingers, and what is called a pinch-out operation which is increase in distance between touch positions. Then, depending on such change in distance between touch positions, not only change in numeric value as described in Embodiments 1 to 12 but also zoom-out display or zoom-in display of the screen can also be achieved.

Then, in MFP 1 in the present embodiment, such setting that change in touch positions of two fingers is made use of for numeric value input as described in Embodiments 1 to 12 or for zoom-in and zoom-out display of the screen is accepted.

Figure 31:
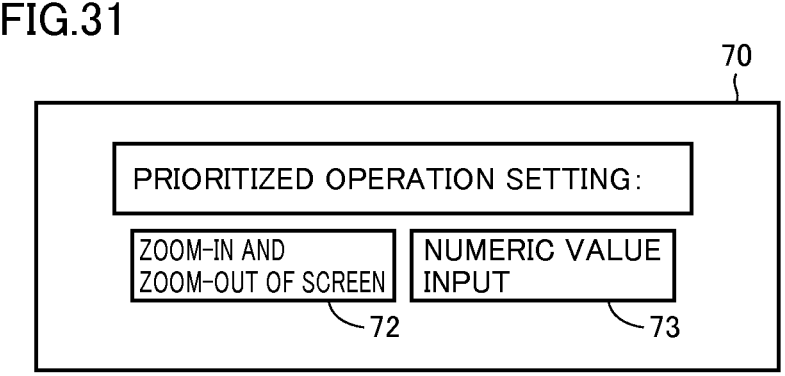
FIG. 31 is a diagram showing one example of a setting screen displayed on the display panel in a certain embodiment.

FIG. 31 is a diagram showing one example of such a setting screen displayed on display panel 134. Referring to FIG. 31, a screen 70 displays a button 72 for making such setting that change in touch positions of two fingers is made use of for zoom-in and zoom-out of the screen and a button 73 for making setting for use for numeric value input.

Figure 32:
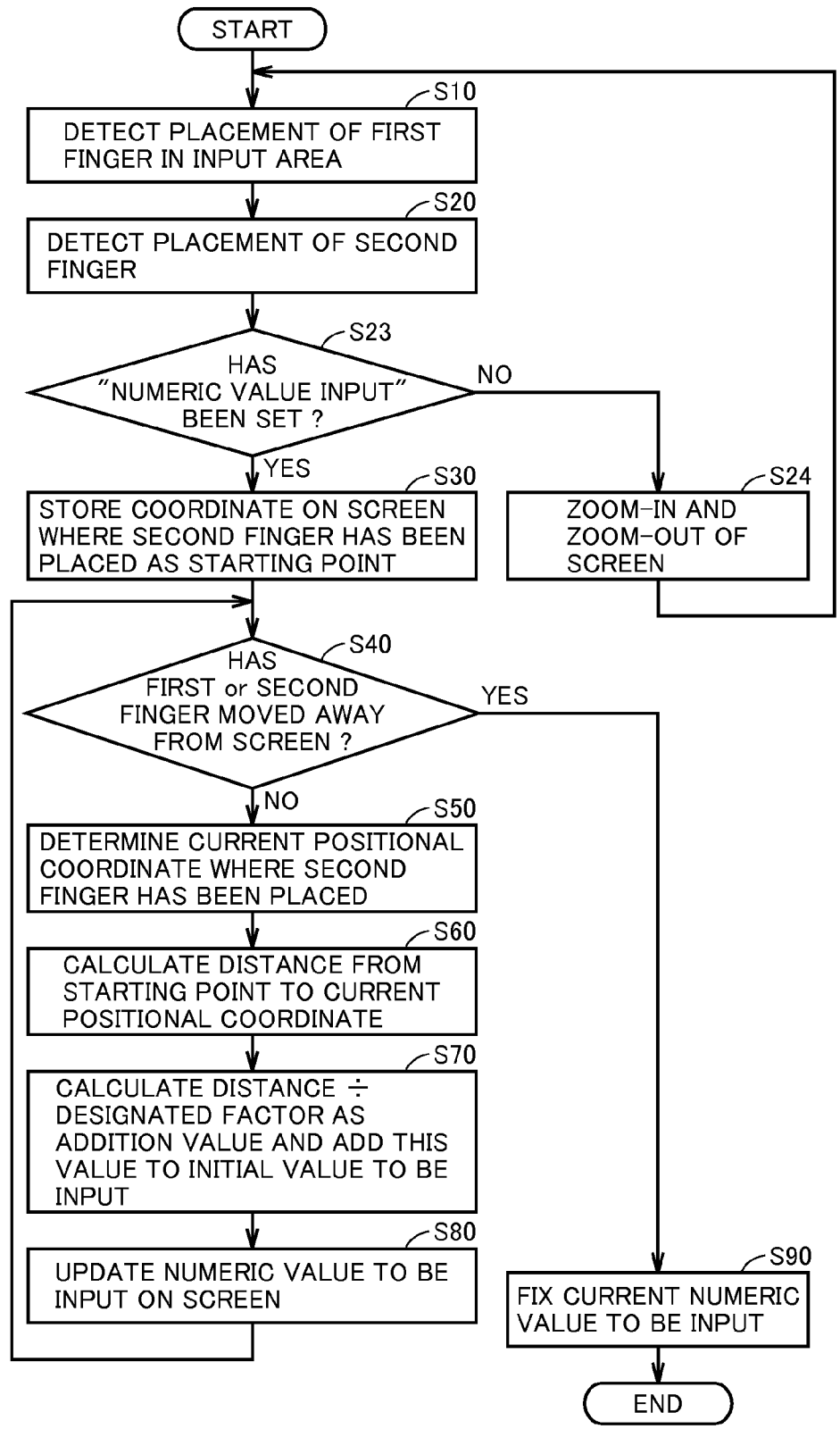
FIG. 32 is a flowchart of numeric value input processing in the certain embodiment.

FIG. 32 is a flowchart of numeric value input processing in the present embodiment. In the numeric value input processing in the present embodiment, each process in steps S10 to S60 is the same as each corresponding process in the numeric value input processing in the first embodiment described with reference to FIG. 5.

In the present embodiment, after the touch operation by the first finger within the input area is detected in step S10 and further touch to display panel 134 by the second finger is detected in step S20, CPU 101 causes the process to proceed to step S23.

In step S24, CPU 101 determines whether or not such setting has been made that change in touch positions of two fingers is made use of for numeric value input in setting as described with reference to FIG. 31, and when it is determined such setting has been made, CPU 101 causes the process to proceed to step S30 and subsequent steps. On the other hand, when setting for use for others such as zoom-in and zoom-out of the screen is made, processing in accordance with the setting contents is performed in step S24.

[Other Variations etc.]

Though the touch operation has been described as a touch operation performed by a human finger in MFP 1 in each embodiment described above, a touch operation may be an operation performed by something other than a human finger, such as a stylus, so long as the touch operation can be detected on touch pad 131.

In addition, though the number of copies has mainly been described as a numeric value to be input in MFP 1, the numeric value updated by the touch operation is not limited thereto. A length of a margin, magnification in printing, density of printing, a coordinate of a position of an image displayed on display panel 134 (such as a menu button), time setting of a clock, and the like in printing of an image on print paper are also possible.

Moreover, though an updated numeric value is determined based on a distance of movement in a touch operation by the second finger in MFP 1, instead of the distance of movement, the updated numeric value may be determined based on other items such as how strong the second finger touches, a duration of touch, a pattern of touch (for example, the number of times of touch operations performed successively at an interval shorter than a prescribed time period), and the like.

Furthermore, though a numeric value is updated based on a touch operation in MFP 1 having an image forming function in the present embodiment, updating of a numeric value based on the touch operation described in the present embodiment can be realized also in an image processing apparatus not having an image forming function (such as a scanner) or a general-purpose information processing apparatus (a computer).

An image processing apparatus in each embodiment described above updates a value stored in storage means based on combination of a plurality of touch operations including a touch operation in a prescribed region.

Thus, a value can be updated based on an operation on a touch pad without displaying a special object for updating a value on a display device. In addition, in the case where a touch operation is performed in a region other than a prescribed region, the value is not updated. Therefore, such a situation that a value is updated also when a touch operation is performed without an intention to update the value can be avoided.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing apparatus, comprising:
   a processing portion configured to accept input of a numeric value for a prescribed setting;
   a storage portion configured to store the numeric value accepted by said processing portion for the prescribed setting;
   a display field defining a portion of a display screen, said display field configured to display the numeric value for the prescribed setting stored in said storage portion; and
   an input area defining a portion of said display screen, said input area configured to accept an input of a touch operation,
   wherein when a first touch operation by a first finger and a second touch operation by a second finger are detected on said input area, said processing portion updates the numeric value stored in said storage portion and displayed on said display field based on a manner of change in touch position resulting from the second touch operation by the second finger on said input area while the first touch operation in a prescribed region of said input area continues to be inputted, and
   wherein (i) a first change in appearance occurs to the input area in response to detecting the first touch operation by the first finger, said first change of appearance delimits said input area from a remainder of the display screen, and (ii) a second change in appearance occurs to the input area in response to detecting the second touch operation by the second finger while the first touch operation continues to be input, said second change of appearance further delimits said input area from the remainder of the display screen.

2. The information processing apparatus according to claim 1, wherein said processing portion is adapted to update the numeric value stored in said storage portion based on a distance by which the touch position resulting from said second touch operation has been changed.

3. The information processing apparatus according to claim 2, wherein when said distance has changed by a length equal to or longer than a length corresponding to a maximum value of an amount of change for the numeric value stored in said storage portion, said processing portion is adapted not to update said numeric value in spite of change in said distance equal to or longer than the length.

4. The information processing apparatus according to claim 2, wherein said processing portion is configured to update said numeric value in response to a shorter distance of movement as an updated value is greater.

5. The information processing apparatus according to claim 1, wherein said processing portion is configured to maintain the numeric value stored in said storage portion when said first touch operation ends before said second touch operation ends.

6. The information processing apparatus according to claim 1, wherein whether the numeric value stored in said storage portion is to be updated to a predetermined value can be set in said information processing apparatus each time start of said first touch operation is detected.

7. The information processing apparatus according to claim 1, wherein said processing portion is configured to update by addition the numeric value stored in said storage portion when the touch position where said second touch operation is started is on one side in a prescribed direction with respect to the touch position resulting from said first touch operation, and is adapted to update by subtraction the numeric value stored in said storage portion when it is on the other side in said prescribed direction.

8. The information processing apparatus according to claim 1, wherein said processing portion is configured to accept input of said numeric value for each digit.

9. The information processing apparatus according to claim 1, wherein
   said input area includes an input region predetermined for each digit for said numeric value, and
   said processing portion is configured to accept input of said numeric value for a digit corresponding to an input region included in an operation target of said first touch operation, in said input region.

10. The information processing apparatus according to claim 1, wherein said processing portion is configured to update the numeric value stored in said storage portion on a condition that input of said first touch operation has ended.

11. The information processing apparatus according to claim 1, wherein
   said processing portion is configured to perform first processing for updating the numeric value stored in said storage portion and second processing for changing a zoom factor for display, based on a manner of change in touch position resulting from the second touch operation at a position different from the touch position resulting from the first touch operation while the first touch operation in the prescribed region of said input area continues to be inputted, and which of said first processing and said second processing is to preferentially be performed is set.

12. The information processing apparatus of claim 1, wherein a change in appearance of the input area includes at least one of: (1) a change in display color of the input area, (2) a change of the outlining of the input area, (3) a change in illumination of the input area, and (4) a change with respect to blinking of the input area.

13. An information processing apparatus, comprising:
a processing portion configured to accept input of a numeric value for a prescribed setting;
a storage portion configured to store the numeric value accepted by said processing portion for the prescribed setting;
a display field defining a portion of a display screen, said display field configured to display the numeric value for the prescribed setting stored in said storage portion; and
an input area defining a portion of said display screen, said input area configured to accept an input of a touch operation,
wherein when a first touch operation by a first finger and a second touch operation by a second finger are detected on said input area, said processing portion updates the numeric value stored in said storage portion and displayed on said display field based on a manner of change in touch position resulting from the second touch operation by the second finger on said input area while the first touch operation in a prescribed region of said input area continues to be inputted, and
wherein said processing portion is configured to switch a positive or negative sign of the numeric value stored in said storage portion when the touch position does not move for a prescribed time period or longer in said second touch operation and then when the touch position resulting from said second touch operation has moved in a prescribed direction.

14. An information processing apparatus, comprising:
a processing portion configured to accept input of a numeric value for a prescribed setting;
a storage portion configured to store the numeric value accepted by said processing portion for the prescribed setting;
a display field defining a portion of a display screen, said display field configured to display the numeric value for the prescribed setting stored in said storage portion; and
an input area defining a portion of said display screen, said input area configured to accept an input of a touch operation,
wherein when a first touch operation by a first finger and a second touch operation by a second finger are detected on said input area, said processing portion updates the numeric value stored in said storage portion and displayed on said display field based on a manner of change in touch position resulting from the second touch operation by the second finger on said input area while the first touch operation in a prescribed region of said input area continues to be inputted, and
wherein said processing portion is configured to switch a positive or negative sign of the numeric value stored in said storage portion when a third touch operation is performed at a position different from positions resulting from said first touch operation and said second touch operation while said first touch operation and said second touch operation continue to be inputted.

15. A method of controlling an information processing apparatus including a processing portion for accepting input of a numeric value for a prescribed setting, a storage portion for storing the numeric value accepted by said processing portion for the prescribed setting, a display field defining a portion of a display screen, said display field for displaying the numeric value for the prescribed setting stored in said storage portion, and an input area defining a portion of said display screen, said input area for accepting an input of a touch operation, comprising:
accepting, by said information processing apparatus, a first touch operation by a first finger in a prescribed region of said input area;
accepting, by said information processing apparatus, a second touch operation by a second finger on said input area while said first touch operation continues to be inputted; and
updating, by said information processing apparatus, the numeric value stored in said storage portion and displayed on said display field based on a manner of change in touch position resulting from said second touch operation by the second finger while the first touch operation continues to be inputted,
wherein (i) a first change in appearance occurs to the input area in response to detecting the first touch operation by the first finger, said first change of appearance delimits said input area from a remainder of the display screen, and (ii) a second change in appearance occurs to the input area in response to detecting the second touch operation by the second finger while the first touch operation continues to be inputted, said second change of appearance further delimits said input area from the remainder of the display screen.

16. A non-transitory computer-readable recording medium recording a program executable by a computer of an information processing apparatus including a processing portion for accepting input of a numeric value for a prescribed setting, a storage portion for storing the numeric value accepted by said processing portion for the prescribed setting, a display field defining a portion of a display screen, said display field for displaying the numeric value for the prescribed setting stored in said storage portion, and an input area defining a portion of said display screen, said input area for accepting a touch operation, said program causing said computer to:
accept a first touch operation, by a first finger, in a prescribed region of said input area; and
accept a second touch operation, by a second finger, on said input area while said first touch operation continues to be inputted; and
update the numeric value stored in said storage portion and displayed on said display field based on a manner of change in touch position resulting from said second touch operation by the second finger while the first touch operation continues to be inputted,
wherein said updating includes switching a positive or negative sign of the numeric value stored in said storage portion when the touch position does not move for a prescribed time period or longer in said second touch operation and then when the touch position resulting from said second touch operation has moved in a prescribed direction.

17. A non-transitory computer-readable recording medium recording a program executable by a computer of an information processing apparatus including a processing portion for accepting input of a numeric value for a prescribed setting, a storage portion for storing the numeric value accepted by said processing portion for the prescribed setting, a display field defining a portion of a display screen, said display field for displaying the numeric value for the prescribed setting stored in said storage portion, and an input area defining a portion of said display screen, said input area for accepting a touch operation, said program causing said computer to:

accept a first touch operation, by a first finger, in a prescribed region of said input area; and accept a second touch operation, by a second finger, on said input area while said first touch operation continues to be inputted; and update the numeric value stored in said storage portion and displayed on said display field based on a manner of change in touch position resulting from said second touch operation by the second finger while the first touch operation continues to be inputted, wherein said updating includes switching a positive or negative sign of the numeric value stored in said storage portion when a third touch operation is performed at a position different from positions resulting from said first touch operation and said second touch operation while said first touch operation and said second touch operation continue to be inputted.

18. A non-transitory computer-readable recording medium recording a program executable by a computer of an information processing apparatus including a processing portion for accepting input of a numeric value for a prescribed setting, a storage portion for storing the numeric value accepted by said processing portion for the prescribed setting, a display field defining a portion of a display screen, said display field for displaying the numeric value for the prescribed setting stored in said storage portion, and an input area defining a portion of said display screen, said input area for accepting a touch operation, said program causing said computer to:

accept a first touch operation, by a first finger, in a prescribed region of said input area; and accept a second touch operation, by a second finger, on said input area while said first touch operation continues to be inputted; and update the numeric value stored in said storage portion and displayed on said display field based on a manner of change in touch position resulting from said second touch operation by the second finger while the first touch operation continues to be inputted, wherein (i) a first change in appearance occurs to the input area in response to detecting the first touch operation by the first finger, said first change of appearance delimits said input area from a remainder of the display screen, and (ii) a second change in appearance occurs to the input area in response to detecting the second touch operation by the second finger while the first touch operation continues to be inputted, said second change of appearance further delimits said input area from the remainder of the display screen.

19. The non-transitory computer readable recording medium according to claim 18, wherein said updating the numeric value includes updating the numeric value stored in said storage portion and displayed on said display field based on a distance by which the touch position resulting from said second touch operation has been changed.

20. The non-transitory computer readable recording medium according to claim 19, wherein when said distance has changed by a length equal to or longer than a length corresponding to a maximum value of an amount of change for the numeric value stored in said storage portion, said updating includes maintaining said value in spite of change in said distance equal to or longer than the length.

21. The non-transitory computer readable recording medium according to claim 19, wherein said updating includes updating said numeric value in response to a shorter distance of movement as an updated value is greater.

22. The non-transitory computer readable recording medium according to claim 18, wherein said updating includes maintaining said numeric value stored in said storage portion when said first touch operation ends before said second touch operation ends.

23. The non-transitory computer readable recording medium according to claim 18, further comprising setting whether the numeric value stored in said storage portion is to be updated to a predetermined value each time start of said first touch operation is detected.

24. The non-transitory computer readable recording medium according to claim 18, wherein said updating includes updating by addition the numeric value stored in said storage portion when the touch position where said second touch operation is started is on one side in a prescribed direction with respect to the touch position resulting from said first touch operation, and updating by subtraction the numeric value stored in said storage portion when the touch position where said second touch operation is started is on the other side in said prescribed direction with respect to the touch position resulting from said first touch operation.

25. The non-transitory computer readable recording medium according to claim 18, wherein said updating includes accepting input of said numeric value for each digit.

26. The non-transitory computer readable recording medium according to claim 18, wherein said input area includes an input region predetermined for each digit for said numeric value, and said accepting includes accepting input of said numeric value for a digit corresponding to an input region included in an operation target of said first touch operation, in said input region.

27. The non-transitory computer readable recording medium according to claim 18, wherein said updating includes updating the numeric value stored in said storage portion on condition that input of said first touch operation has ended.

28. The non-transitory computer readable recording medium according to claim 18, wherein said updating includes performing first processing for updating the numeric value stored in said storage portion and second processing for changing a zoom factor for display, based on a manner of change in touch position resulting from the second touch operation at a position different from the touch position resulting from the first touch operation while the first touch operation in the prescribed region of said input area continues to be inputted, and said method further comprises setting which of said first processing and said second processing is to preferentially be performed.

* * * * *